(12) United States Patent
Wang et al.

(10) Patent No.: US 11,115,451 B2
(45) Date of Patent: Sep. 7, 2021

(54) METHODS AND APPARATUS FOR SIGNALING VIEWPORTS AND REGIONS OF INTEREST

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

(*) Notice: Subject to any disclaimer, the term of this patent is extended or adjusted under 35 U.S.C. 154(b) by 0 days.

(21) Appl. No.: 16/353,963

(22) Filed: Mar. 14, 2019

(65) Prior Publication Data

US 2019/0297132 A1 Sep. 26, 2019

Related U.S. Application Data

(60) Provisional application No. 62/647,903, filed on Mar. 26, 2018.

(51) Int. Cl.
*H04L 29/06* (2006.01)
*H04N 21/4728* (2011.01)

(52) U.S. Cl.
CPC ....... *H04L 65/607* (2013.01); *H04N 21/4728* (2013.01)

(58) Field of Classification Search
CPC ..... H04L 65/60; H04L 65/607; H04L 65/602; H04N 21/00; H04N 21/4728; H04N 21/85406; H04N 19/167; H04N 19/132
See application file for complete search history.

(56) References Cited

U.S. PATENT DOCUMENTS

2017/0347026 A1* 11/2017 Hannuksela ..... H04N 21/26258
2018/0061002 A1    3/2018 Lee et al.
(Continued)

FOREIGN PATENT DOCUMENTS

WO   WO-2018069466 A1 *  4/2018  ......... H04N 21/8456

OTHER PUBLICATIONS

Choi et al., WD of ISO/IEC 23000-20 Omnidirectional Media Application Format. International Organisation for Standardisation, Coding of Moving Pictures and Audio, ISO/IEC JTC1/SC29/WG11 N16189. Jun. 2016:42 pages.
(Continued)

*Primary Examiner* — Jonathan A Bui
(74) *Attorney, Agent, or Firm* — Wolf, Greenfield & Sacks, P.C.

(57) ABSTRACT

The techniques described herein relate to methods, apparatus, and computer readable media configured to encode and/or decode video data. The video data can include a region of interest. The video data can include a region structure associated with the video data that specifies one or more aspects of the region of interest based on a sphere, such as a coordinate aspect, a size aspect, a range aspect, or some combination thereof, the region structure comprising data indicative of whether the region structure comprises data indicative of one or more global aspects of the region of interest that applies to each of a set of samples associated with the region structure. The region of interest in the video data can be determined based on the data indicative of whether the region structure comprises data indicative of the one or more global aspects of the region of interest.

18 Claims, 21 Drawing Sheets

(56) References Cited

U.S. PATENT DOCUMENTS

| | | | |
|---|---|---|---|
| 2018/0199042 A1* | 7/2018 | Wang | H04N 21/44008 |
| 2019/0104316 A1* | 4/2019 | Da Silva Pratas Gabriel | H04N 19/167 |
| 2019/0297132 A1* | 9/2019 | Wang | H04N 21/85406 |
| 2019/0356899 A1* | 11/2019 | Oh | H04N 21/2343 |
| 2020/0045286 A1* | 2/2020 | Boyce | H04N 21/84 |

OTHER PUBLICATIONS

[No Author Listed], Information technology—Coded representation of immersive media—Part 2: Omnidirectional media format. ISO/IEC FDIS 23090-2:2018(E). 2018:168 pages.

[No Author Listed], Information technology—Coded representation of immersive media (MPEG-I)—Part 2: Omnidirectional media format. ISO/IEC FDIS 23090-2:201x (E). Feb. 7, 2018:178 pages.

[No Author Listed], Information technology—Coding of audio-visual objects, Part 12: ISO base media file format. International Standard, ISO/IEC 14496-12, Fourth Edition. Jul. 15, 2012:196 pages.

[No Author Listed], Information technology—Dynamic adaptive streaming over HTTP (DASH)—Part 1: Media presentation description and segment formats. International Standard, ISO/IEC 23009-1, Draft Third Edition. Jul. 26, 2018:218 pages.

[No Author Listed], Information technology—MPEG systems technologies—Part 10: Carriage of timed metadata metrics of media in ISO base media file format / Amd 1 Carriage of spatial information. ISO/IEC 23001-10:2015/FDAM 1:2016(E), ISO/IEC JTC1/SC29/WG11 N16191. Jun. 2, 2016:8 pages.

* cited by examiner

```
aligned(8) class 2DCartesianCoordinatesSampleEntry
    extends MetadataSampleEntry ('2dcc') {
    unsigned int(16) reference_width;
    unsigned int(16) reference_height;
}
```

```
aligned(8) class 2DCartesianCoordinatesSample {
    unsigned int(16) top_left_x;
    unsigned int(16) top_left_y;
    unsigned int(16) width;
    unsigned int(16) height;
    unsigned int(1) interpolate;
    unsigned int(7) reserved;
}
```

```
aligned(8) class 2DCartesianCoordinatesSampleEntry 702
 extends MetadataSampleEntry ('2dcc') { 704
    unsigned int(16) reference_width; 706
    unsigned int(16) reference_height;
    bit(6) reserved = 0; 708
    unsigned int(1) dynamic_location_flag;
    unsigned int(1) dynamic_size_flag; 710
    if (dynamic_location_flag == 0) {
        unsigned int(16) static_top_left_x; 712
        unsigned int(16) static_top_left_y; 714
    }
    if (dynamic_size_flag == 0) {
        unsigned int(16) static_width; 716
        unsigned int(16) static_height; 718
    }
}
```

```
aligned(8) class 2DCartesianCoordinatesSample() {
    if (dynamic_location_flag) {  ← 708
        unsigned int(16) top_left_x;  ← 752
        unsigned int(16) top_left_y;  ← 754
    }
    if (dynamic_size_flag) {  ← 710
        unsigned int(16) width;  ← 756
        unsigned int(16) height;  ← 758
    }
    unsigned int(1) interpolate;  ← 760
    unsigned int(7) reserved;
}
```

```
aligned(8) class 3DSphericalCoordinatesSampleEntry
  extends MetadataSampleEntry ('3dsc') {
  unsigned int(8) shape_type;          802
  bit(6) reserved = 0;
  unsigned int(1) dynamic_orientation_flag;   804
  unsigned int(1) dynamic_range_flag;    806
  unsigned int(1) unit_sphere_flag = 1;    808
  if (dynamic_orientation_flag == 0) {
    signed int(32) static_centre_azimuth;    810
    signed int(32) static_centre_elevation;  812
    singed int(32) static_centre_tilt;       814
  }
  if (dynamic_range_flag == 0) {
    unsigned int(32) static_azimuth_range;    816
    unsigned int(32) static_elevation_range;  818
  }
  if (unit_sphere_flag == 0) {
    unsigned int(32) sphere_radius;    820
  }
}
```

```
aligned(8) class 3DSphericalCoordinatesSample(){
    if (dynamic_orientation_flag) {
        signed int(32) centre_azimuth;
        signed int(32) centre_elevation;
        singed int(32) centre_tilt;
    }
    if (dynamic_range_flag) {
        unsigned int(32) azimuth_range;
        unsigned int(32) elevation_range;
    }
    unsigned int(1) interpolate;
    unsigned int(7) reserved;
}
```

FIG. 9

```
aligned(8) class 6DSphericalCoordinatesSampleEntry extends MetadataSampleEntry ('6dsc') {
    unsigned int(8) shape_type;                 1102
    bit(5) reserved = 0;
    unsigned int(1) dynamic_location_flag;      1104
    unsigned int(1) dynamic_orientation_flag;   1106
    unsigned int(1) dynamic_range_flag;         1108
    unsigned int(1) unit_sphere_flag = 1;       1110
    if (dynamic_location_flag == 0) {
        signed int(32) static_centre_x;         1112
        signed int(32) static_centre_y;         1114
        singed int(32) static_centre_z;}        1116
    if (dynamic_orientation_flag == 0) {
        signed int(32) static_centre_azimuth;   1118
        signed int(32) static_centre_elevation; 1120
        singed int(32) static_centre_tilt;}     1122
    if (dynamic_range_flag == 0) {
        unsigned int(32) static_azimuth_range;  1124
        unsigned int(32) static_elevation_range;1126
    if (unit_sphere_flag == 0) {
        unsigned int(32) sphere_radius;         1128
    }}
```

```
aligned(8) class 6DSphericalCoordinatesSample(){
    if (dynamic_location_flag) {
        signed int(32) centre_x;       // 1202
        signed int(32) centre_y;       // 1204
        singed int(32) centre_z;       // 1206
    }
    if (dynamic_orientation_flag) {
        signed int(32) centre_azimuth;    // 1208
        signed int(32) centre_elevation;  // 1210
        singed int(32) centre_tilt;       // 1212
    }
    if (dynamic_range_flag) {
        unsigned int(32) azimuth_range;    // 1214
        unsigned int(32) elevation_range;  // 1216
    }
    unsigned int(1) interpolate;   // 1218
    unsigned int(7) reserved;
}
```

FIG. 12

```
aligned(8) class 3DCartesianCoordinatesSampleEntry
    extends MetadataSampleEntry ('3dcc') {                  1402
    bit(5) reserved = 0;
    unsigned int(1) dynamic_orientation_flag;               1404
    unsigned int(1) dynamic_range_flag;                     1406
    unsigned int(1) unit_sphere_flag = 1;
    if (dynamic_orientation_flag == 0) {
        signed int(32) static_centre_azimuth;               1408
        signed int(32) static_centre_elevation;             1410
        singed int(32) static_centre_tilt;                  1412
    }
    if (dynamic_range_flag == 0) {
        unsigned int(32) static_width_range;                1414
        unsigned int(32) static_height_range;               1416
    }
    if (unit_sphere_flag == 0) {
        unsigned int(32) sphere_radius;                     1418
    }
}
```

FIG. 14

```
aligned(8) class 3DCartesianCoordinatesSample(){
    if (dynamic_orientation_flag) {            ← 1502
        signed int(32) centre_azimuth;         ← 1504
        signed int(32) centre_elevation;       ← 1506
        singed int(32) centre_tilt;
    }
    if (dynamic_size_flag) {                   ← 1508
        unsigned int(32) width_range;          ← 1510
        unsigned int(32) height_range;
    }
    unsigned int(1) interpolate;               ← 1512
    unsigned int(7) reserved;
}
```

FIG. 15

```
aligned(8) class 6DCartesianCoordinatesSampleEntry extends MetadataSampleEntry ('6dcc') {
    unsigned int(8) shape_type;  ← 1602
    bit(4) reserved = 0;
    unsigned int(1) dynamic_location_flag; ← 1604
    unsigned int(1) dynamic_orientation_flag; ← 1606
    unsigned int(1) dynamic_range_flag; ← 1608
    unsigned int(1) unit_sphere_flag = 1; ← 1610
    if (dynamic_location_flag == 0) {
        signed int(32) static_centre_x; ← 1612
        signed int(32) static_centre_y; ← 1614
        singed int(32) static_centre_z; ← 1616
    }
    if (dynamic_orientation_flag == 0) {
        signed int(32) static_centre_azimuth; ← 1618
        signed int(32) static_centre_elevation; ← 1620
        singed int(32) static_centre_tilt; ← 1622
    }
    if (dynamic_range_flag == 0) {
        unsigned int(32) static_width_range; ← 1624
        unsigned int(32) static_height_range; ← 1626
    }
    if (unit_sphere_flag == 0) {
        unsigned int(32) sphere_radius; ← 1628
    }
}
```

```
aligned(8) class 6DCartesianCoordinatesSample() {
    if (dynamic_location_flag) {  ← 1702
        signed int(32) centre_x;  ← 1704
        signed int(32) centre_y;  ← 1706
        singed int(32) centre_z;  ← 1708
    }
    if (dynamic_orientation_flag) {
        signed int(32) centre_azimuth;  ← 1710
        signed int(32) centre_elevation;  ← 1712
        singed int(32) centre_tilt;  ← 1714
    }
    if (dynamic_size_flag) {
        unsigned int(32) width_range;  ← 1716
        unsigned int(32) height_range;  ← 1718
    }
    unsigned int(1) interpolate;  ← 1720
    unsigned int(7) reserved;
}
```

METHODS AND APPARATUS FOR SIGNALING VIEWPORTS AND REGIONS OF INTEREST

RELATED APPLICATIONS

This application claims priority under 35 U.S.C. § 119(e) to U.S. Provisional Application Ser. No. 62/647,903, filed Mar. 26, 2018, entitled "METHODS OF SIGNALING RECTANGULAR AND SPHERICAL REGIONS IN 2D AND 3D COORDINATE SYSTEMS FOR VR MEDIA CONTENT", which is herein incorporated by reference in its entirety.

TECHNICAL FIELD

The techniques described herein relate generally to video coding, and particularly to viewports and/or regions of interest in video content, including signaling rectangular and spherical regions in two-dimensional (2D), three-dimensional (3D), and/or six-dimensional (6D) coordinate systems for video content.

BACKGROUND OF INVENTION

Various types of video content, such as 2D content, 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for representing rectangular and spherical regions of interest (ROIs) in video content, including in 2D, 3D and 6D coordinate systems.

Some embodiments relate to a decoding method for decoding video data. The method comprises receiving video data comprising a region of interest, determining a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising data indicative of whether the one or more aspects of the region structure comprises data indicative of one or more global aspects of the region of interest that applies to each of a set of samples associated with the region structure. The method includes determining the region of interest in the video data based on the data indicative of whether the region structure comprises data indicative of the one or more global aspects of the region of interest.

In some examples, determining the region of interest in the video data based on the data indicative of whether the region structure comprises data indicative of one or more global aspects of the region of interest comprises determining the region structure does not specify a first global aspect of the region of interest, and determining, for each sample associated with the region structure, a first coordinate aspect for the sample for the region of interest.

In some examples, determining the region of interest in the video data based on the data indicative of whether the region structure comprises data indicative of one or more global aspects of the region of interest comprises determining the region structure comprises data indicative of an orientation of the region of interest and a range of the region of interest, and determining the orientation and range of the region of interest, wherein the orientation and range applies to each sample associated with the region structure. Determining the region structure comprises data indicative of the range of the region of interest can include determining an azimuth and elevation of the region of interest. Determining the region structure can include data indicative of the range of the region of interest comprises determining a width and a height of the region of interest. Some examples can include determining the region structure comprises data indicative of a location of the region of interest, and determining the location of the region of interest, wherein the location applies to each sample associated with the region structure. Determining the location can include determining a center location of the region of interest.

In some examples, determining the region of interest in the video data based on the data indicative of whether the region structure comprises data indicative of one or more global aspects of the region of interest comprises determining the region structure comprises data indicative of a location of the region of interest and a size of the region of interest, and determining the location and size of the region of interest, wherein the location and size applies to each sample associated with the region structure.

Some embodiments relate to a method for encoding video data. The method can include encoding video data comprising a region of interest, comprising encoding a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising data indicative of whether the one or more aspects of the region structure comprises data indicative of one or more global aspects of the region of interest that applies to each of a set of samples associated with the region structure.

In some examples, encoding the region of interest in the video data comprises encoding data indicative of the region structure not specifying a first global aspect of the region of interest, and encoding, for each sample associated with the region structure, a first coordinate aspect for the sample for the region of interest.

In some examples, encoding the region of interest comprises encoding data indicative of an orientation of the region of interest and a range of the region of interest, wherein the orientation and range applies to each sample associated with the region structure. Encoding data indicative of a range of the region of interest can include encoding an azimuth and elevation of the region of interest. Encoding data indicative of a range of the region of interest can include encoding a width and a height of the region of interest. Some examples can include encoding, in the region structure, data indicative of a location of the region of interest, wherein the location applies to each sample associated with the region structure. Encoding the location can include encoding a center location of the region of interest.

In some examples, encoding the region structure can include encoding data indicative of a location of the region of interest and a size of the region of interest, wherein the location and size applies to each sample associated with the region structure.

Some embodiments relate to an apparatus configured to decode video data. The apparatus comprises a processor in communication with memory. The processor is configured to execute instructions stored in the memory that cause the processor to receive video data comprising a region of interest, determine a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising data indicative of whether the one or more aspects of the region structure comprises data indicative of one or more global aspects of the region of interest that applies to each of a set of samples associated with the region structure, and determine the region of interest in the video data based on the data indicative of whether the region structure comprises data indicative of the one or more global aspects of the region of interest.

Some embodiments relate to an apparatus for encoding video data. The apparatus can include a processor in communication with memory, the processor being configured to execute instructions stored in the memory that cause the processor to encode video data comprising a region of interest, comprising encoding a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising data indicative of whether the one or more aspects of the region structure comprises data indicative of one or more global aspects of the region of interest that applies to each of a set of samples associated with the region structure.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIGS. 6A and 6B show an example of a 2D coordinate specification and an associated 2D Cartesian coordinates sample, respectively.

FIG. 7A shows an exemplary syntax for a two-dimensional Cartesian coordinate sample entry, according to some embodiments.

FIG. 7B shows an exemplary 2D Cartesian coordinates sample, according to some embodiments.

FIG. 8 shows an exemplary syntax for a 3D spherical coordinate sample entry, according to some embodiments.

FIG. 9 shows an example of a syntax for a 3D spherical coordinate sample, according to some embodiments.

FIG. 11 shows an exemplary syntax for a 6D spherical coordinates sample entry, according to some embodiments.

FIG. 12 shows an exemplary syntax for a 6D spherical coordinates sample, according to some embodiments.

FIG. 14 shows an exemplary syntax for a 3D Cartesian coordinates sample entry, according to some embodiments.

FIG. 15 shows an exemplary syntax for a 3D Cartesian coordinates sample, according to some embodiments.

FIG. 16 is an exemplary syntax for a 6D Cartesian coordinates sample entry, according to some embodiments.

FIG. 17 shows an exemplary syntax for a 6D Cartesian coordinates sample, according to some embodiments.

DETAILED DESCRIPTION OF INVENTION

Various techniques can be used to represent regions of interest (ROIs) and/or viewports, and to signal such ROI representations, including in composite tracks of file formats (e.g., ISOBMFF) as well as in streaming formats (e.g., MPEG DASH).

The inventors have discovered and appreciated deficiencies with previous techniques used to specify aspects of ROIs/viewports in 2D and spherical content (e.g., 3D content). For example, aspects such as the orientation, range, location, and/or size of the region are specified on a per-sample basis. Such approaches can include redundant and unnecessary information, such as when one or more samples share the same region aspects. The techniques disclosed herein provide for specifying coordinate information, such as 2D, 3D and/or 6D coordinate information for regions (e.g., spherical regions or rectangular regions) in a manner that can specify one or more global (e.g., static) aspects that are common across a plurality of samples for the region (e.g., two or more samples of the samples of the region, all of the samples of the region, and/or the like). The techniques can therefore reduce unnecessary and redundant data, which can reduce the amount of data associated with the video content, reduce the processing time for the video content (e.g., including encoding and/or decoding of the content), and/or the like.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
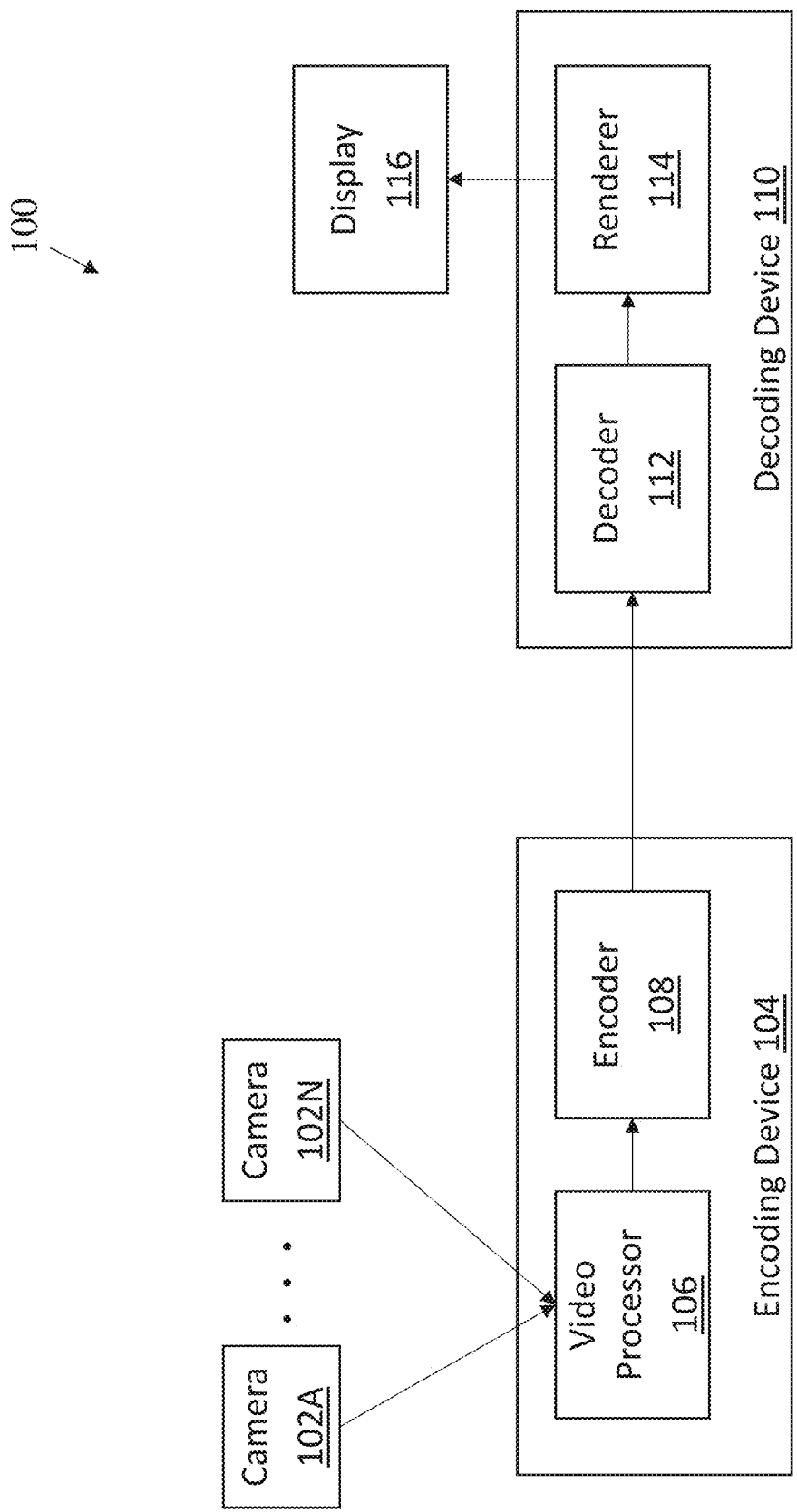
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
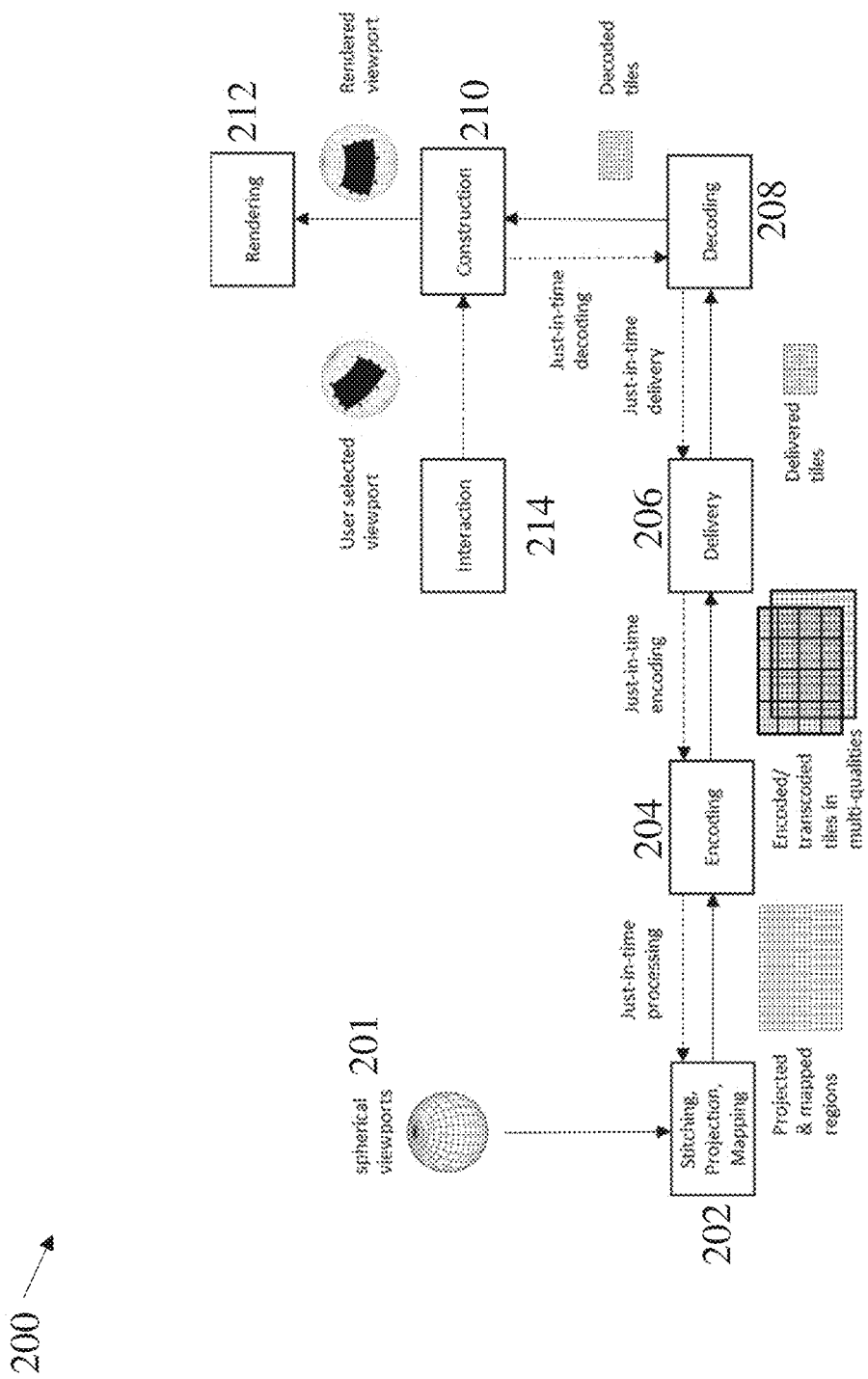
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

A region of interest (ROI) is somewhat similar in concept to viewport. An ROI may, for example, represent a region in 3D or 2D encodings of omnidirectional video. An ROI can have different shapes (e.g., a square, or a circle), which can be defined in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared. In such implementations, a region of interest typically has a separate video track that carries the ROI content. Thus, the encoded video specifies the ROI, and how the ROI video is associated with the underlying video. The techniques described herein are described in terms of a region, which can include a viewport, a ROI, and/or other areas of interest in video content.

ROI or viewport tracks can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191), which is hereby incorporated by reference herein in its entirety, describes an ISO Base Media File Format (ISOBMFF) file format that uses a timed metadata track to signal that a main 2D video track has a 2D ROI track. As another example, Dynamic Adaptive Streaming over HTTP (DASH) includes a spatial relationship descriptor to signal the spatial relationship between a main 2D video representation and its associated 2D ROI video representations. ISO/IEC 23009-1, draft third edition (w16225), Jul. 29, 2016, addresses DASH, and is hereby incorporated by reference herein in its entirety. As a further example, the Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media. OMAF specifies a coordinate system, such that the user's viewing perspective is from the center of a sphere looking outward towards the inside surface of the sphere. OMAF includes extensions to ISOBMFF for omnidirectional media as well as for timed metadata for sphere regions.

When signaling an ROI, various information may be generated, including information related to characteristics of the ROI (e.g., identification, type (e.g., location, shape, size), purpose, quality, rating, etc.). Information may be generated to associate content with an ROI, including with the visual (3D) spherical content, and/or the projected and mapped (2D) frame of the spherical content. An ROI can be characterized by a number of attributes, such as its identification, location within the content it is associated with, and its shape and size (e.g., in relation to the spherical and/or 3D content). Additional attributes like quality and rate ranking of the region can also be added, as discussed further herein.

Figure 3B:
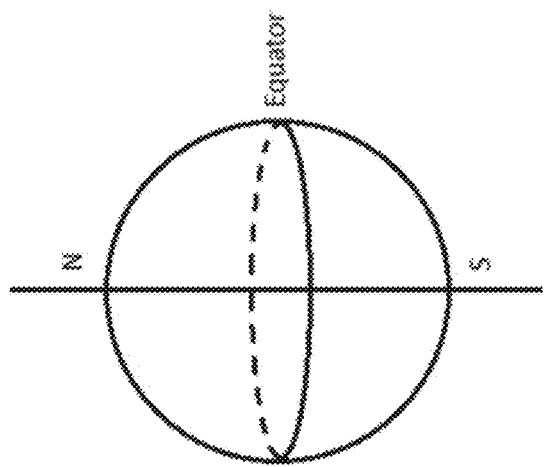
FIG. 3B shows the north (N) and south (S) poles of a sphere, according to some examples.
Figure 3A:
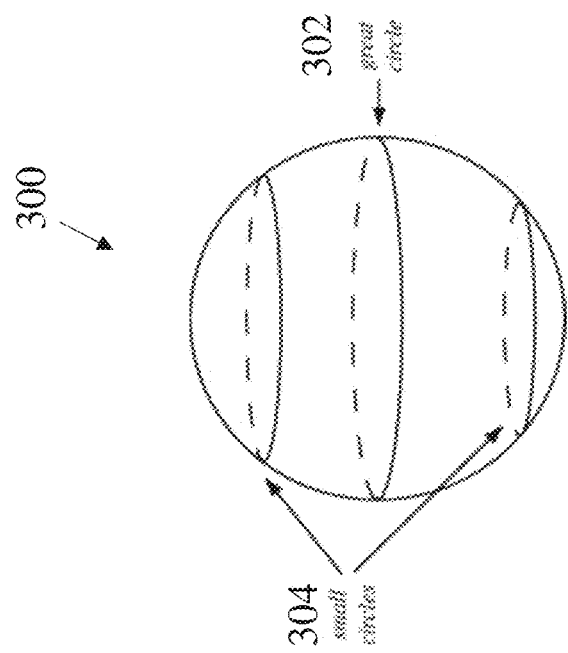
FIG. 3A shows a sphere with one great circle and two small circles, according to some examples.

In some embodiments, in order to specify the shape and size of an ROI on the sphere, certain spherical notions can be used. FIG. 3A shows a sphere 300 with one great circle 302 and two small circles 304. As shown, the great circle 302 spans the intersection of the spherical surface with a 2D plane (not shown) passing through the center of the sphere 300. Thus, the great circle 302 is a section of the sphere 300 that contains a diameter of the sphere 300. The small circles 304 show the intersection of the spherical surface with a 2D plane (not shown) that does not pass through the center of the sphere 300, and therefore each is associated with a section of the sphere 300 that does not contain a diameter of the sphere 300.

Figure 3C:
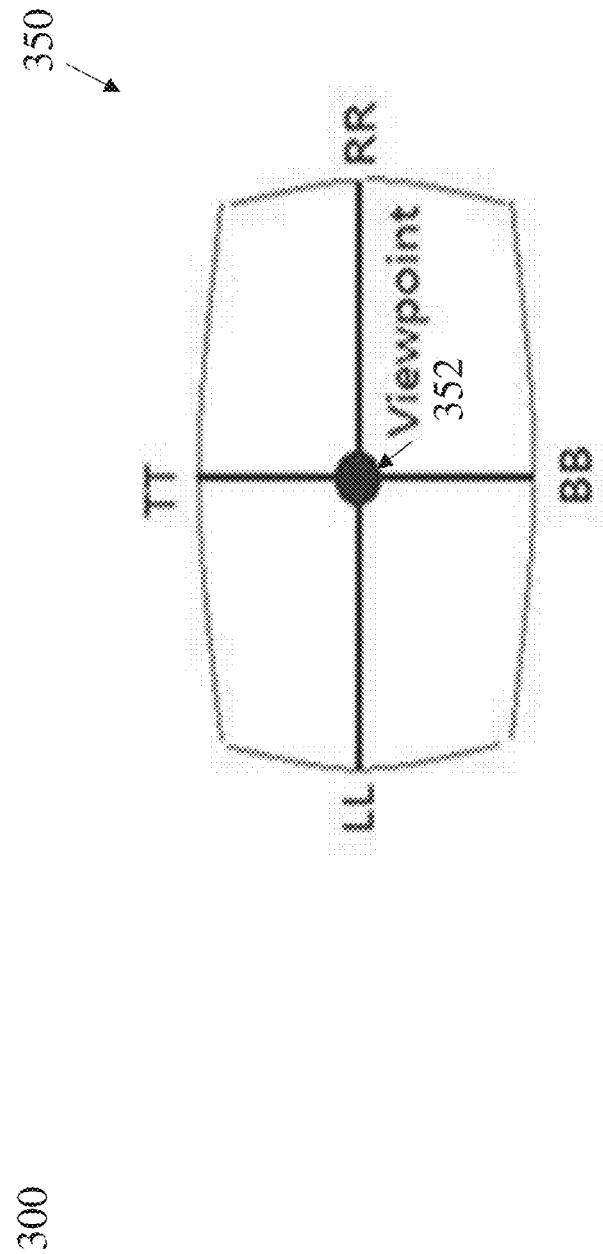
FIG. 3C shows an ROI with a generally rectangular shape, according to some embodiments.

There can be a number of different ways to join, or to connect using a line, two points on a sphere using great and/or small circles. Any two points on the sphere can be joined by a segment of a unique great circle, which provides the shortest path between them on the sphere. The two points can also be joined by (e.g., an infinite number of) small circles intersected by 2D planes containing the two points. When using small circles, the path between the two points becomes unique when the 2D plane is fixed (e.g., fixed orthogonal to a particular axis of the sphere). For exemplary purposes, the descriptions of the viewports that follow assume that the north (N) and south (S) poles shown in FIG. 3B are fixed, together with a default coordinate system for yaw, pitch and roll (not shown). Each ROI can have an ROI center, which is a point on the sphere, defined as a viewpoint using its pitch and yaw to indicate that the ROI is the region on the sphere containing the viewpoint. For example, FIG. 3C shows an ROI 350 with a generally rectangular shape, according to some embodiments. The ROI 350 includes a viewpoint 352 as its center. The ROI 350 includes two points along the horizontal direction: the left point (LL) that is at a center of the left side of the viewpoint, and the right point (RR) that is at a center of the right side of the viewpoint. The ROI 350 includes two points along the vertical direction: the top point (TT) that is at a center of the top side of the viewpoint, and the bottom point (BB) that is at a center of the bottom side of the viewpoint.

MPEG-B Part 10 specifies a type of 2D Cartesian coordinates ('2dcc') for a rectangular region on the 2D plane, which is provided in the Appendix of N16191, "Text of ISO/IEC 23001-10:201x/FDAM 1 Carriage of spatial information, Geneva, CH (June 2016), which is hereby incorporated by reference herein in its entirety. Thus, for a 2D case, the '2dcc' can be used to identify rectangular region. For a 3D case, the representation can be complex (e.g., more complex than the 2D case), since there can be other aspects such as a direction and a region based on that direction. A viewport is a (e.g., 3D) region of an omnidirectional image or video that can be used for display and viewing. A viewpoint can represent a single camera, and multiple viewpoints can be used when there are multiple cameras (e.g., to identify where each camera is). A viewpoint group can refer to a group of viewpoints that share a same common reference coordinate system.

Figure 4B:
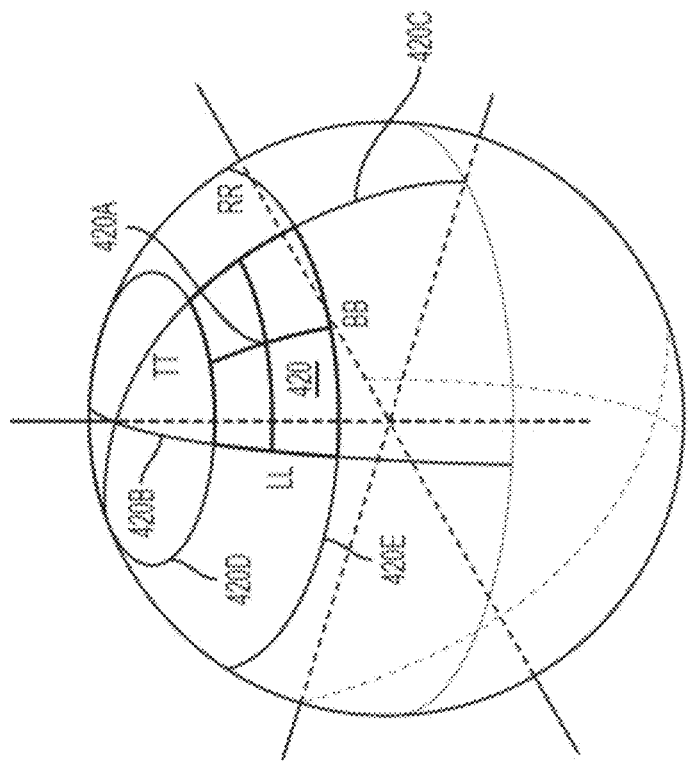
FIG. 4B shows a second rectangular ROI, according to some embodiments.
Figure 4A:
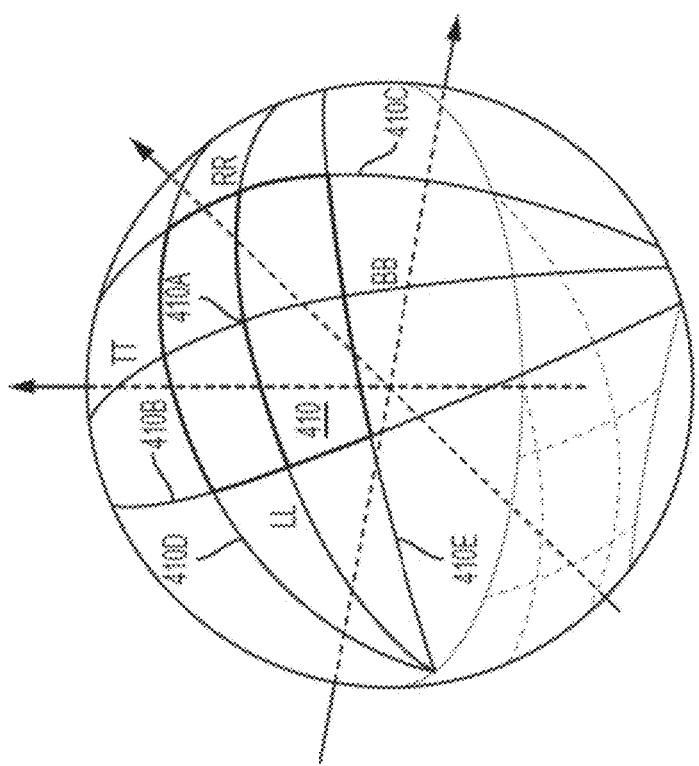
FIG. 4A shows a rectangular ROI, according to some embodiments.

FIGS. 4A-4B, which are discussed further herein, show exemplary representations of ROI shapes, according to some embodiments. In some embodiments, the ROI can take the shape of a rectangle. Other shapes can be used as well, such as circles, triangles, three-dimensional shapes, and the like. Some embodiments provide techniques to describe such various ROIs using a list of characteristics to define the viewport with different shapes, locations, and/or other additional information regarding the ROIs, as discussed further herein.

A rectangular ROI can be expressed in various ways. For example, a rectangular area can be described on the surface of the sphere, which can be expressed using small circles, large circles, and/or a combination of small and large circles. FIG. 4A shows a rectangular ROI 410, according to some embodiments. The rectangular ROI 410 has its center viewpoint 410A at (yaw, pitch) or (centreAzimuth, centreElevation) (e.g., which can be specified with respect to an underlying default coordinate system, not shown, the center of which can be referred to as (x,y,z) and occurring at the location of the intersection of the three dotted lines shown in FIGS. 4A-4B). Rectangular ROI 410 has horizontal and vertical boundaries on great circles. A first great circle 410B intersects point LL (e.g., which can be referred to as the first center azimuth value, or cAzimuth1), a second great circle 410C intersects point RR (e.g., which can be referred to as the second center azimuth value, or cAzimuth2), a third great circle 410D intersects point TT (e.g., which can be referred to as the second elevation value, or cElevation2), and a fourth great circle 410E intersects point BB (e.g., which can be referred to as the first elevation value, or cElevation1). The rectangular ROI 410 has a width defined along the points (LL-Viewpoint-RR) or (cAzimuth1-Viewpoint-cAzimuth2), which may be taken as yaw_width. The rectangular ROI 410 has a height defined along the points (TT-Viewpoint-BB) or (cElevation2-Viewpoint-cElevation1), which may be taken as pitch_height. In some embodiments, the rectangular ROI 410 can be signaled by yaw, pitch, yaw_width, and pitch_height. The value of yaw_width can specify the width between the vertical boundaries. The value of pitch_height can specify the height between the horizontal boundaries.

FIG. 4B shows a second rectangular ROI 420, according to some embodiments. The rectangular ROI 420 has its center viewpoint 420A at (yaw, pitch) or (centreAzimuth, centreElevation). The rectangular ROI 420 has vertical boundaries on great circles. A first great circle 420B intersects point LL (e.g., or cAzimuth1), and a second great circle 420C intersects point RR (e.g., or cAzimuth2). The rectangular ROI 420 has horizontal boundaries on small circles. A first small circle 420D intersects point TT (e.g., or cElevation2), and a second small circle 420E intersects point BB (e.g., cElevation1). The rectangular ROI 420 has a height defined along the (TT-Viewpoint-BB) or (cElevation2-Viewpoint-cElevation1), which may be taken as pitch_height. The rectangular ROI 420 has a width defined along the points (LL-Viewpoint-RR) or (cAzimuth1-Viewpoint-cAzimuth2), which may be taken as yaw_width. In some embodiments, the rectangular ROI 420 can be signaled by yaw, pitch, yaw_width, and pitch_height. The value of yaw_width can specify the width between the vertical boundaries. The value of pitch_height can specify the height between the horizontal boundaries.

In some embodiments, a rectangular ROI can be represented by swapping the use of great and small circles to what is shown in FIG. 4B. For example, great circles can be used in the horizontal direction (e.g., band), and small circles can be used in the vertical direction (e.g., band). Such an exemplary ROI can have its center viewpoint at (yaw, pitch), and horizontal boundaries on great circles with the height (TT-Viewpoint-BB) between the horizontal boundaries being pitch_height, and vertical boundaries on small circles with the width (LL-Viewpoint-RR) between the vertical boundaries being yaw_width. This exemplary ROI can be signaled using (yaw, pitch, yaw_width, pitch_height).

In some embodiments, a rectangular ROI can be represented using small circles in both horizontal and vertical directions (e.g., bands). Such an exemplary rectangular ROI has its center viewpoint at (yaw, pitch), and horizontal and vertical boundaries on small circles with the width (LL-Viewpoint-RR) between the vertical boundaries being yaw_width, and the height (TT-Viewpoint-BB) between the horizontal boundaries being pitch_height. This exemplary ROI can be signaled as (yaw, pitch, yaw_width, pitch_height).

In some embodiments, the rectangular ROIs discussed herein can be specified using other techniques. For example, a rectangular ROI can be specified using (yaw, pitch, yaw_left, yaw_right, pitch_top, pitch_bottom), where the center is at (yaw, pitch) and the LL, RR, TT and BB points of the ROI are defined by yaw_left, yaw_right, pitch_top and pitch_bottom, respectively. For example, LL is at (yaw_left, pitch_bottom+(pitch_top-pitch_bottom)/2).

If multiple ROIs are supported, each ROI can be associated with an index number or a shape number. For example, if two ROIs are supported, those two ROIs can be supported with index numbers 1 and 2 to identify the type of ROI, as discussed further below. As another example, each of the ROIs shown in FIGS. 4A-4B can be represented using index numbers or shape numbers (e.g., 1 or 2 for this example, or unique numbers for each of however many ROIs are supported by the system).

The inventors have developed improvements to existing region technologies, such as viewport and ROI technologies, to provide for improved region functionality. As discussed further herein, the techniques can include enhanced types of 3D or 6D spherical coordinates for a spherical region (e.g., '3dsc' and '6dsc'). The techniques can include types of 3D and 6D Cartesian coordinates for a rectangular region (e.g., '3dcc' and '6dcc'), to signal ROIs, viewports, and/or fields of view in media content, such as VR media content. The coordinates, including 3D and/or 6D coordinates, can relate to various aspects of the region. For example, the coordinates can relate to the position, orientation and/or size of the spherical/rectangular region. As another example, the coordinates can relate to the shape of the spherical region. The spherical region can be encoded, for example, in a media track or track group (e.g., a region media track or track group), with respect to another media track or track group (e.g., a main region media track or track group) (e.g., using ISOBMFF). These media tracks can be, for example, untransformed, transformed and/or derived tracks for media content of spherical/rectangular regions.

The techniques can be used to specify global (e.g., static) coordinates at the coordinate sample entry level rather than at the sample level. A sample can refer to some sort of media data associated with a particular time instance. The sample could be, for example, a single frame of video content, a collection of multiple frames (e.g., where the frames are used to put together a big picture), a collection of frame(s) and/or other data (e.g., audio and video data), metadata (e.g., metadata with time information that can be synchronized with a video and/or audio sample), and/or the like. For example, a timed metadata track can include metadata and associated time information that can be associated with video and audio tracks. For example, metadata in a timed metadata track can refer to a particular time instance to indicate that the metadata refers to the particular frame.

The techniques described herein can be incorporated and/or applied to previous region specifications to improve those specifications. For example, OMAF provides a specification for a spherical region. In some embodiments, the techniques can leverage the OMAF spherical region, and use it as a base to define coordinates (e.g., 3D and/or 6D spherical and Cartesian coordinates) for MPEG-B part 10. The coordinates described herein can be used, for example, natively and/or in enhanced and restrained manners. For example, the coordinates can be used to support various types of VR media content such as those with 3DoF, 6DoF, 3DoF+, windowed 6DoF, and/or omnidirectional 6DoF (e.g., as provided for in MPEG-I, Part 1).

Figure 5:
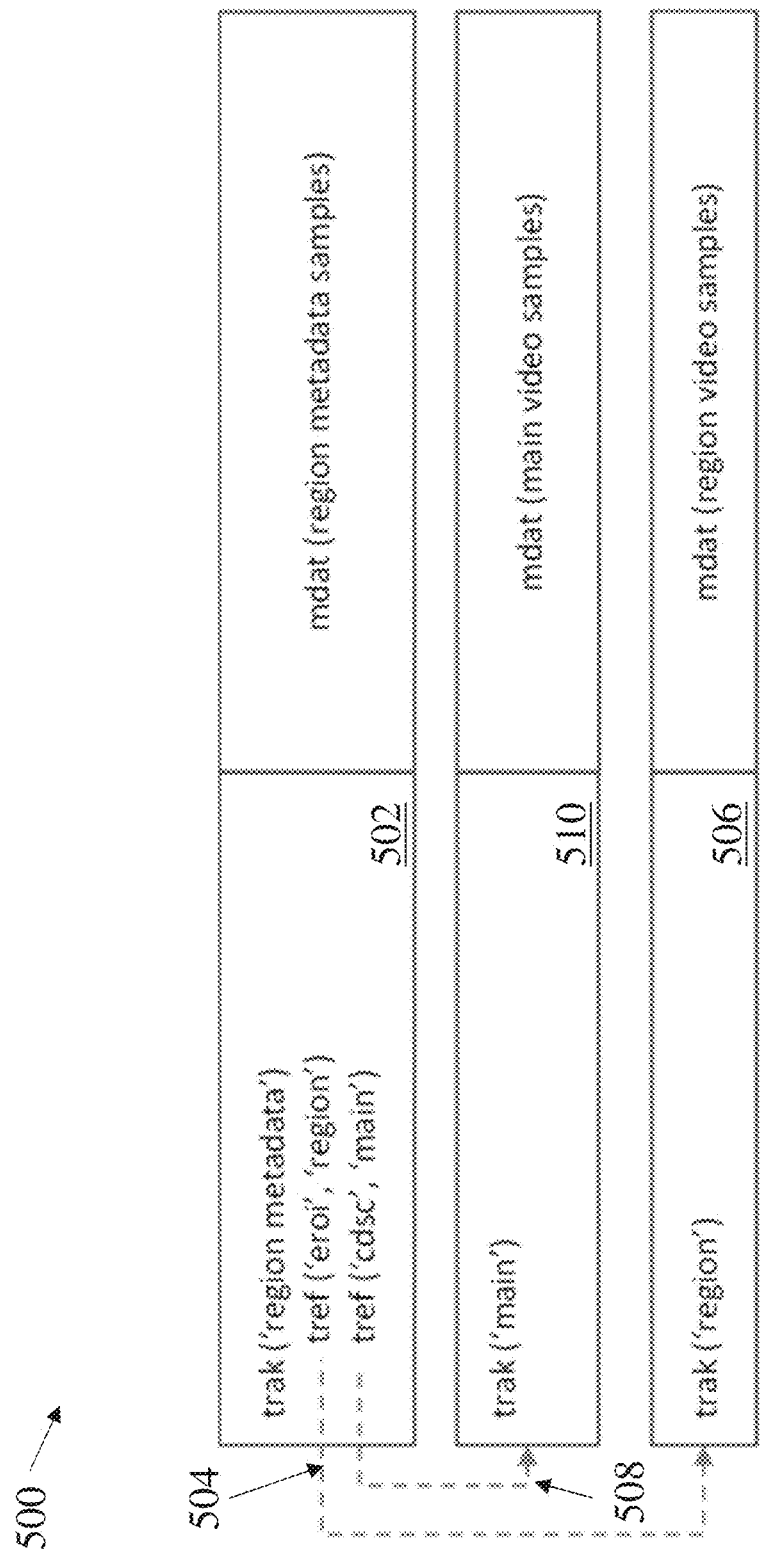
FIG. 5 shows a diagram of references from a metadata track, according to some embodiments.

Using the techniques discussed herein, new references can be supported for the media content. A viewport or ROI can be specified using a sample entry, a sample format, or both. An ROI specification can be associated with the video (e.g., metadata describing the ROI). For example, the ROI specification can be carried in a timed metadata track of ISOBMFF and/or within a video track. For example, FIG. 5 shows a diagram 500 of references from a metadata track, according to some embodiments. FIG. 5 includes a timed region metadata track 502. The timed region metadata track 502 can be a spherical and/or rectangular metadata track. The timed region metadata track 502 includes a reference (shown as 504) to a region video track 506. Like the timed region metadata track 502, the region video track 506 can be a spherical and/or rectangular timed region metadata track. In this example, the reference 504 is made using the track reference type encoded ROI 'eroi,' which is described in N17399, "FIDS Text of ISO/IEC 23090-2," Gwangju, KR (January 2018) (MPEG-1, Part 1), which is hereby incorporated by reference herein in its entirety. The 'eroi' can be used to refer to content of the region being specified as a pre-encoded track. The timed region metadata track 502 also includes a reference (shown as 508) to a main region video track 510. The main region video track 510 can be a spherical and/or rectangular main region video track. In this example, the reference 508 is made using the track reference type 'cdsc,' which is described in ISO/IEC 124496-12:2005 "Information technology—Coding of audio-visual objects—Part 12: ISO Base Media File Format," which is hereby incorporated by reference herein in its entirety. For example, 'cdsc' can be used to link a descriptive or metadata track to the content it describes. This example using 'eroi' or 'cdsc' is for illustrative purposes, as other techniques can be used without departing from the spirit of the techniques described herein.

The track references can signal information regarding the region and related information. For example, in the example in FIG. 5, the references 504 and 508 signal, respectively, that the region video track 506 is an encoding of the video in only the region described by the region metadata track 502, and that the coordinate metadata in the region metadata track 502 describes the main video track 510 having a region as defined by the metadata.

In some embodiments, the Cartesian coordinates discussed herein, including 3D and 6D Cartesian coordinates, differ from their spherical counterparts. For example, the Cartesian coordinates discussed herein can differ in their regions being 2D rectangular, rather than 3D spherical (e.g., '6dcc' and '6dsc', discussed further herein). The techniques can facilitate, for example, moving among a plurality of different cameras using different viewpoints and/or viewports (e.g., including viewports specified as a rectangle, specified on a sphere, etc.). As another example, the current '2dcc' specification does not have a sample entry level definition for regions whose locations and/or sizes do not change at the sample level.

As discussed herein, for a 2D case, MPEG Part 10 includes the '2dcc' specification that can be used to identify a region of interest in a big region. FIGS. 6A and 6B show an example of the '2dcc' specification 600 and an associated 2DCartesianCoordinatesSample 650, respectively. The '2dcc' specification 600 can be used for dynamic cases, where the location and the size is specified at the sample level using the 2DCartesianCoordinatesSample 650, which can allow the metadata to change on a per-sample basis. For example, as the media presentation moves along in time, the attributes can change (e.g., the top-left-x, top-left-y, and/or other fields in the 2DCartesianCoordinatesSample 650 can change).

The '2dcc' specification does not provide for static use cases. For example, if the locations and/or sizes do not change at the sample level, the previous '2dcc' approach requires specifying (e.g., and processing) redundant data for each sample. FIG. 7A shows an exemplary syntax for a two-dimensional Cartesian coordinate sample entry 700, according to some embodiments. For illustrative purposes, an example can include a 2DCartesianCoordinatesSampleEntry '2dcc' 702 that extends MetadataSampleEntry, which will be used to explain the concepts herein, although one of skill can appreciate that other nomenclatures, structures, and/or fields can be used without departing from the spirit of the invention. The sample entry described further herein can provide an optimal approach to minimize the number of bits used and/or processing required, e.g., when the rectangular region has either static location, static size, or both.

The 2D Cartesian coordinates sample entry 700 can provide spatial information related to the referenced track, which can be expressed in a two-dimension Cartesian coordinate system. The reference_width 704 and reference_height 706 can provide the width and height of the reference rectangular space in which the rectangular region coordinates (e.g., top_left_x, top_left_y, width and height) are computed, respectively. The reference_width 704 and reference_height 706 can, for example, provide for associating a rectangular region metadata track with video tracks of different resolutions but representing the same visual source.

The dynamic_location_flag 708 can specify whether the location of the region changes. For example, a dynamic_location_flag 708 equal to 0 can specify that the location of the rectangular region remains unchanged in all samples referring to this sample entry. A dynamic_location_flag 708 equal to 1 can specify that the location of the rectangular region is indicated in the sample format.

The dynamic size flag 710 can specify whether the size of the region changes. For example, a dynamic size flag 710 equal to 0 can specify that the size of the rectangular region remains unchanged in the samples referring to this sample entry. A dynamic size flag 710 equal to 1 can specify that the width and height of the rectangular region are indicated in the sample format.

The statictop_left_x 712 and statictop_left_y 714 can specify the horizontal and vertical coordinate, respectively, of the top-left corner of the rectangular region for the samples referring to this sample entry. The static_width 716 and static_height 718 can specify the width and height, respectively, of the rectangular region for the samples referring to this sample entry.

FIG. 7B shows an exemplary 2D Cartesian coordinates sample 750, according to some embodiments. For illustrative purposes, an example can include a 2DCartesianCoordinatesSample class, which will be used to explain the concepts herein, although one of skill can appreciate that other nomenclatures, structures, and/or fields can be used without departing from the spirit of the invention. The top_left_x 752 and top_left_y 754 can provide the horizontal and vertical coordinate, respectively, of the top-left corner of the rectangle region associated with the media sample of the referenced track. The width 756 and height 758 can provide the width and height, respectively, of the rectangular region associated with the media sample of the referenced track.

The interpolate 760 can indicate the continuity in time of the successive samples. When interpolate 760 is set to true (e.g., 1), the application may linearly interpolate values of the ROI coordinates between the previous sample and the current sample. When interpolate 760 is false (e.g., 0), there may not be any interpolation of values between the previous and the current samples. In some embodiments, the sync samples for region metadata tracks are samples with interpolate 760 set to false (e.g., 0). In some embodiments, when using interpolation, it can be expected (e.g., by a decoding device) that the interpolated samples match the presentation time of the samples in the referenced track. For example, for each video sample of a video track, the decoding device can calculate one interpolated 2D Cartesian coordinate sample. For example, the metadata may have timing that is more coarse than the video timing. So interpolation can be used to determine how to handle content in such a scenario.

As shown in the exemplary 2D Cartesian coordinates sample 750, the dynamic_location_flag 708 and the dynamic size flag 710 specified using the 2D Cartesian coordinates sample entry can control the size and number of fields of the 2D Cartesian coordinates sample 750. If either, or both, of the dynamic_location_flag 708 and the dynamic_size_flag 710 is set to false, then the associated fields are not defined as part of the sample. Advantageously, for static aspects, including size and/or location, the size of the sample entry can be controlled accordingly.

Figure 10:
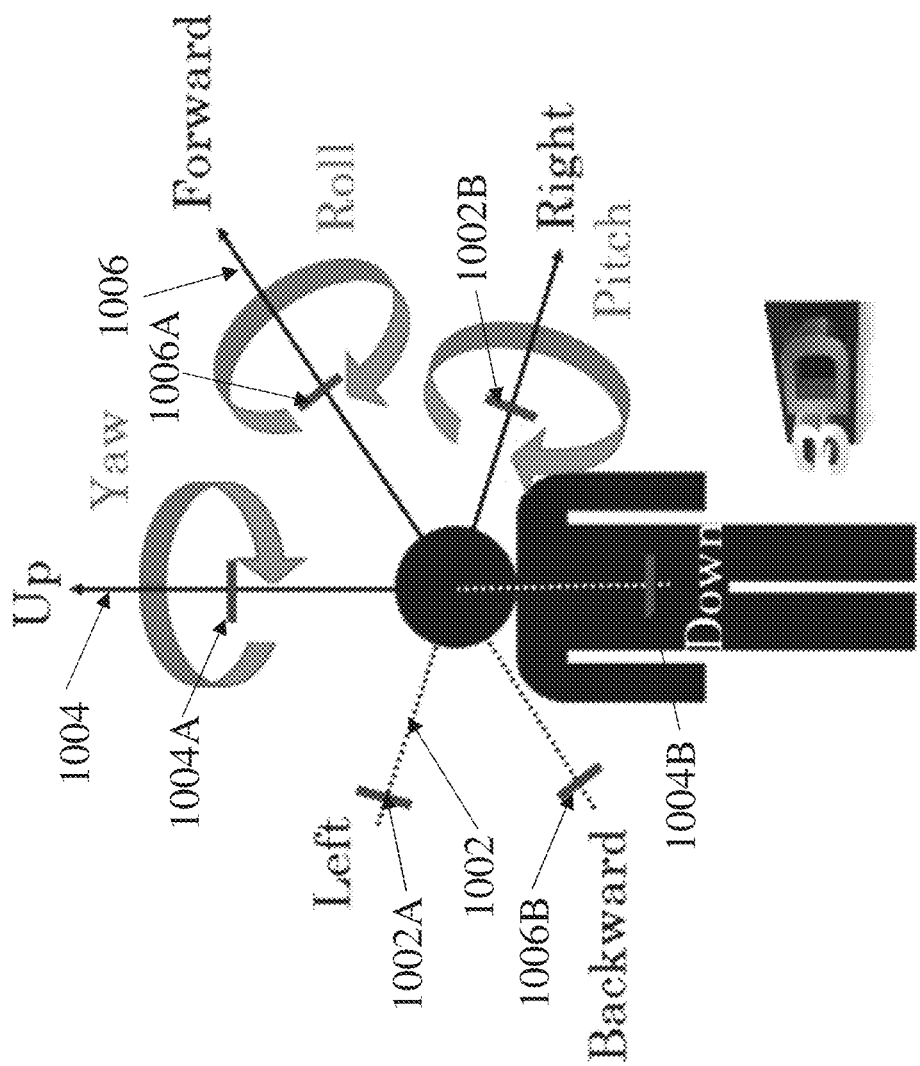
FIG. 10 shows an example of 3D and 6D coordinates, as well as profiled ranges, according to some examples.

Regarding 3D Spherical Coordinates, referring to FIG. 10, 3D coordinates can be specified with three degrees of freedom, including rotations around the X axis 1002 (pitch), Y axis 1004 (yaw) and Z axis 1006 (roll). In some embodiments, the spheres defined through the coordinate system may be non-unit spheres, such that the spheres have a non-unit radius. In some embodiments, the spheres can be specified as only unit-spheres.

A 3D spherical coordinate sample entry can provide spatial information of a spherical region (e.g., of a region that is related to a referenced track). In some embodiments, the spatial information can be specified in a three-dimension spherical coordinate system. FIG. 8 shows an exemplary syntax for a 3D spherical coordinate sample entry 800, according to some embodiments. For illustrative purposes, an example can include a 3DSphericalCoordinateSampleEntry '3dsc' that extends MetadataSampleEntry, which will be used to explain the concepts herein, although one of skill can appreciate that other nomenclatures, structures, and/or fields can be used without departing from the spirit of the invention.

The shape_type 802 can be used to indicate how the sphere region is specified. For example, a shape_type 802 equal to 0 can specify that the sphere region is specified by four great circles. A shape_type 802 equal to 1 can specify that the sphere region is specified by two azimuth circles and two elevation circles. In some embodiments, values of the shape_type 802 can be reserved. For example, shape_type 802 values greater than 1 can be reserved. In some embodiments, the value of shape_type 802 can be used as the shape type value (e.g., as specified in an associated specification, such as the OMAF specification).

The dynamic_orientation_flag 804 can specify whether the orientation changes (e.g., whether the region is moving). For example, if the user views the region at the direction but does not move his head, then the flag can indicate whether or not that orientation moves (e.g., is static or dynamic). For example, a dynamic_orientation_flag 804 equal to 0 can specify that the orientation (e.g., center azimuth, elevation and/or tilt) of the sphere region remains unchanged in the samples referring to this sample entry. A dynamic_orientation_flag 804 equal to 1 can specify that the orientation of the sphere region are indicated in the sample format.

The dynamic_range_flag 806 can specify whether the range changes (e.g., whether the size changes, or not). For example, a dynamic_range_flag 806 equal to 0 can specify that the azimuth and elevation ranges of the sphere region remain unchanged in the samples referring to this sample entry. A dynamic_range_flag 806 equal to 1 can specify that the azimuth and elevation ranges of the sphere region are indicated in the sample format.

The unit sphere flag 808 can indicate whether the sphere is a unit sphere. For example, a unit_sphere_flag 808 equal to 0 can specify that the sphere is not a unit sphere (e.g., its radius is not equal to 1). A unit_sphere_flag 808 equal to 1 can specify that the sphere is not a unit sphere (e.g., which can be the default case). The unit sphere can be used for zooming in and out. For example, if the radius is 10, then it could zoom in at 10$x$, looking in magnified 10 times. If the content is zoomed in, then the user sees a smaller region on a bigger sphere; if the content is zoomed out, then the user sees a larger region of a smaller sphere.

The static_centre_azimuth 810 and static_centre_elevation 812 can specify the azimuth and elevation values, respectively, of the center of the sphere region (e.g., in units of $2^{-16}$ degrees). In some embodiments, static_centre_azimuth 810 can be in the range of $-180\times2^{16}$ to $180\times2^{16}-1$, inclusive, and static_centre_elevation 812 can be in the range of $-90\times2^{16}$ to $90\times2^{16}$, inclusive.

The static_centre_tilt 814 can specify the tilt angle of the sphere region (e.g., in units of $2^{-16}$ degrees). In some embodiments, the static_centre_tilt can be in the range of $-180\times2^{16}$ to $180\times2^{16}-1$, inclusive.

The static_azimuth_range 816 and static_elevation_range 818 can specify the azimuth and elevation ranges, respectively, of the sphere region for each sample referring to this sample entry (e.g., in units of $2^{-16}$ degrees). The static_azimuth_range 816 and static_elevation_range 818 can specify the ranges through the centre point of the sphere region. In some embodiments, the static_azimuth_range 816 can be in the range of 0 to $360\times2^{16}$, inclusive. In some embodiments, the static_elevation_range 818 can be in the range of 0 to $180\times2^{16}$, inclusive. In some embodiments, when the static_azimuth_range 816 and static_elevation_range 818 are present and are both equal to 0, the sphere region for each sample referring to this sample entry can be a point on a spherical surface. When static_azimuth_range 816 and static_elevation_range 818 are present, the values of azimuth_range and elevation range can be inferred to be equal to static_azimuth_range 816 and static_elevation_range 818, respectively.

The sphere_radius 820 can specify the radius of the sphere (e.g., when it is not a unit sphere).

As shown in the 3D spherical coordinate sample entry 800, the dynamic_orientation_flag 804, the dynamic_range_flag 806, and the unit_sphere_flag 808 can control the size and number of fields of the 3D spherical coordinate sample entry 800. If one or more of the dynamic_orientation_flag 804, the dynamic_range_flag 806, and the unit_sphere_flag 808 is set to 0 in this example, then the associated fields are defined as part of the sample (otherwise, the fields are not defined). Advantageously, for static aspects, including orientation and/or range, the size of the sample entry can be controlled accordingly.

FIG. 9 shows an example of a syntax for a 3D spherical coordinate sample 900, according to some embodiments. For illustrative purposes, an example can include the 3DSphericalCoordinatesSample class, which will be used to explain the concepts herein, although one of skill can appreciate that other nomenclatures, structures, and/or fields can be used without departing from the spirit of the invention. As discussed below, the 3D spherical coordinate sample 900 can include fields similar to some of the fields discussed in conjunction with the 3D spherical coordinate sample entry 800, but which are not static.

The centre_azimuth 902 and centre_elevation 904 can specify the azimuth and elevation values, respectively, of the center of the sphere region (e.g., in units of $2^{-16}$ degrees). In some embodiments, the centre_azimuth 902 can be in the range of $-180 \times 2^{16}$ to $180 \times 2^{16} - 1$, inclusive. The centre_elevation 904 can be in the range of $-90 \times 2^{16}$ to $90*2^{16}$, inclusive.

The centre_tilt 906 can specify the tilt angle of the sphere region (e.g., in units of $2^{-16}$ degrees). In some embodiments, the centre_tilt 906 can be in the range of $-180 \times 2^{16}$ to $180 \times 2^{16} - 1$, inclusive.

The azimuth_range 908 and elevation_range 910, when present, can specify the azimuth and elevation ranges, respectively, of the sphere region (e.g., specified in units of $2^{-16}$ degrees). The azimuth_range 908 and elevation_range 910 can specify the range through the centre point of the sphere region. In some embodiments, when azimuth_range 908 and elevation_range 910 are not present, they can be inferred to be equal to static_azimuth_range and static_elevation_range, respectively, in the sample entry. In some embodiments, the azimuth_range 908 can be in the range of 0 to $360 \times 2^{16}$, inclusive. The elevation_range 910 can be in the range of 0 to $180 \times 2^{16}$, inclusive.

The interpolate 912 can indicate the continuity in time of the successive samples. For example, interpolate 912 equal to 0 can specify that the values of centre_azimuth 902, centre_elevation 904, centre_tilt 906, azimuth_range 908 (if present), and elevation_range 910 (if present) in this sample apply to the target media samples. Interpolate 812 equal to 1 can specify that the values of centre_azimuth 902, centre_elevation 904, centre_tilt 906, azimuth_range 908 (if present), and elevation_range 910 (if present) that apply to the target media samples are linearly interpolated from the values of the corresponding fields in this sample and the previous sample. In some embodiments, the value of interpolate 912 for a sync sample, the first sample of the track, and the first sample of a track fragment shall be equal to 0.

In some embodiments, when centre_tilt 906 is equal to 0, the specified sphere region can be derived. For example, if both azimuth_range 908 and elevation_range 910 are equal to 0, the sphere region can be a point on a spherical surface. Otherwise, the sphere region can be defined using certain variables. For example, the variables centreAzimuth, centreElevation, cAzimuth1, cAzimuth, cElevation1, and cElevation2 can be derived as follows:

centreAzimuth=centre_azimuth 902÷65536 centreElevation=centre_elevation 904÷65536 cAzimuth1=(centre_azimuth 902−azimuth_range 908÷2)÷65536 cAzimuth2=(centre_azimuth+azimuth_range 908÷2)÷65536 cElevation1=(centre_elevation 904−elevation_range 910÷2)÷65536 cElevation2=(centre_elevation 904+elevation_range 910÷2)÷65536

The sphere region can be defined in conjunction with the shape type. Referring to FIG. 4A, for example, when the shape type value is equal to 0 (e.g., indicating that the shape type is that shown in FIG. 4A), the sphere region can be specified by four great circles 410B-410D, defined by four points cAzimuth1 (LL), cAzimuth2 (RR), cElevation1 (BB), cElevation2 (TT) and the center point 410A defined by centreAzimuth and centreElevation. As another example, referring to FIG. 4B, when the shape type value is equal to 1 (e.g., indicating that the shape type is that shown in FIG. 4B), the sphere region can be specified by two azimuth circles (or great circles) 420B and 420C and two elevation circles (or small circles) 420D and 420E defined by four points cAzimuth1 (LL), cAzimuth2 (RR), cElevation1 (BB), cElevation2 (TT) and the center point 420A defined by centreAzimuth and centreElevation.

In some embodiments, when centre_tilt 906 is not equal to 0, the sphere region can be derived (e.g., as explained above), and then a tilt rotation can be applied along the axis originating from the sphere origin passing through the center point of the sphere region. In some embodiments, the angle value can increase clockwise when looking from the origin towards the positive end of the axis. The final sphere region can be the region obtained after applying the tilt rotation.

As shown in the exemplary 3D spherical coordinates sample 900, the dynamic_orientation_flag and the dynamic_range_flag specified using the 3D spherical coordinates sample entry can control the size and number of fields of the 3D spherical coordinates sample 900. If either, or both, of the dynamic_orientation_flag and the dynamic_range_flag is set to false, then the associated fields are not defined as part of the sample. Advantageously, for static aspects, including orientation and/or range, the size of the sample entry can be controlled accordingly.

Referring to FIG. 10, as discussed herein, 3D coordinates can be specified with three degrees of freedom, including rotations around the X axis 1002 (pitch), Y axis 1004 (yaw) and Z axis 1006 (roll). 6D spherical coordinates can be specified for the content with 6 DoF, which can be content with 3DoF and with full translational movements along X axis 1002 (left and right), Y axis 1004 (up and down) and Z axis 1006 (back and forward).

FIG. 11 shows an exemplary syntax for a 6D spherical coordinates sample entry 1100, according to some embodiments. For illustrative purposes, an example can include the 6DSphericalCoordinatesSampleEntry '6dsc' which extends MetadataSampleEntry, which will be used to explain the concepts herein, although one of skill can appreciate that other nomenclatures, structures, and/or fields can be used without departing from the spirit of the invention. As discussed further herein, the 6D spherical coordinates sample entry can provide spatial information of a spherical region related to the referenced track expressed in a three-dimension spherical coordinate system with additional three-degrees of freedom in full translational movements along X, Y and Z axes.

The 6D spherical coordinates sample entry 1100 can include fields that are similar to the fields discussed in conjunction with the 3D spherical coordinate sample entry 800 (e.g., shape_type 802, dynamic_orientation_flag 804, dynamic_range_flag 806, the unit_sphere_flag 808, static_centre_azimuth 810, static_centre_elevation 812, static_centre_tilt 814, static_azimuth_range 816, static_elevation_range 818, and sphere_radius 820). Referring to the fields shown in the 6D spherical coordinates sample entry 1100, the shape_type 1102 can be used to indicate how the sphere region is specified (e.g., four great circles, two azimuth circles and two elevation circles, and/or the like). The dynamic_orientation_flag 1106 can specify whether the orientation changes in the samples referring to this sample entry. The dynamic_range_flag 1108 can specify whether the range changes in the samples referring to this sample entry. The unit_sphere_flag 1110 can indicate whether the sphere is a unit sphere. The static_centre_azimuth 1118 and static_centre_elevation 1120 can specify the azimuth and elevation values, respectively, of the center of the sphere region. The static_centre_tilt 1122 can specify the tilt angle of the sphere region. The static_azimuth_range 1124 and static_elevation_range 1126 can specify the azimuth and elevation ranges, respectively, of the sphere region for each sample referring to this sample entry. The sphere_radius 1128 can specify the radius of the sphere.

The 6D spherical coordinates sample entry 1100 includes additional fields related to the additional 3 DoF. The dynamic_location_flag 1104 can specify whether the center location of the sphere changes. For example, a dynamic_location_flag 1104 equal to 0 can specify that the center location (center x, y and z) of the sphere region remains unchanged in the samples referring to this sample entry. A dynamic_location_flag 1104 equal to 1 can specify that the center location of the sphere region is indicated in the sample format. The static_centre_x 1112, static_centre_y 1114, and static_centre_z 1116 can specify the x, y and z axis values, respectively, of the center of the sphere region, with respect to the origin of the underlying coordinate system.

As shown in the 6D spherical coordinate sample entry 1100, the dynamic_location_flag 1104, the dynamic_orientation_flag 1106, and the dynamic_range_flag 1108 can control the size and number of fields of the 6D spherical coordinate sample entry 1100. If one or more of the dynamic_location_flag 1104, the dynamic_orientation_flag 1106, and the dynamic_range_flag 1108 is set to 0 in this example, then the associated fields are defined as part of the sample (otherwise, the fields are not defined). Advantageously, for static aspects, including location, orientation and/or range, the size of the sample entry can be controlled accordingly.

FIG. 12 shows an exemplary syntax for a 6D spherical coordinates sample 1200, according to some embodiments. For illustrative purposes, an example can include the 6DSphericalCoordinatesSample class, which will be used to explain the concepts herein, although one of skill can appreciate that other nomenclatures, structures, and/or fields can be used without departing from the spirit of the invention.

The 6D spherical coordinates sample 1200 can include fields that are similar to the fields discussed in conjunction with the 3D spherical coordinate sample 900 (e.g., centre_azimuth 902, centre_elevation 904, centre_tilt 906, azimuth_range 908, elevation_range 910, and interpolate 912). Referring to the fields shown in the 6D spherical coordinates sample 1200, the centre_azimuth 1208 and centre_elevation 1210 can specify the azimuth and elevation values, respectively, of the center of the sphere region. The centre_tilt 1212 can specify the tilt angle of the sphere region. The azimuth_range 1214 and elevation_range 1216, when present, can specify the azimuth and elevation ranges, respectively, of the sphere region. The interpolate 1218 can indicate the continuity in time of the successive samples.

The 6D spherical coordinates sample 1200 can also include additional fields related to the additional 3 DoF. In particular, the centre_x 1202, centre_y 1204 and centre_z 1206 specify the x, y and z axis values, respectively, of the centre of the sphere region.

As shown in the exemplary 6D spherical coordinates sample 1200, the dynamic_location_flag, dynamic_orientation_flag, and dynamic_range_flag specified using the 6D spherical coordinates sample entry can control the size and number of fields of the 6D spherical coordinates sample 1200. If one or more of the dynamic_location_flag, dynamic_orientation_flag, and dynamic_range_flag is set to false, then the associated fields are not defined as part of the sample. Advantageously, for static aspects, including location, orientation and/or range, the size of the sample entry can be controlled accordingly.

Viewports/ROIs can be specified using Cartesian coordinates. 3D Cartesian coordinates can be specified for the content with 3DoF, and with the field of view to be a 2D rectangular region (e.g., rather than a 3D spherical region). The plane of the region can describe a 2D region or rectangular region in the 3D context. The 3D Cartesian coordinates can be used, for example, to overlay content on the rectangle range over spherical background. For example, it can be desirable to show a commercial or text to indicate there is a car within a viewport being observed by a user. Since the region is within the 3D environment, it can be desirable to specify where the region is in terms of its orientation (e.g., direction from the center of the sphere to the surface of the region) and the size (e.g., the size of width/height of rectangle). A rectangular region may not be a viewport, rather it may simply just identify a rectangle region.

Figure 13:
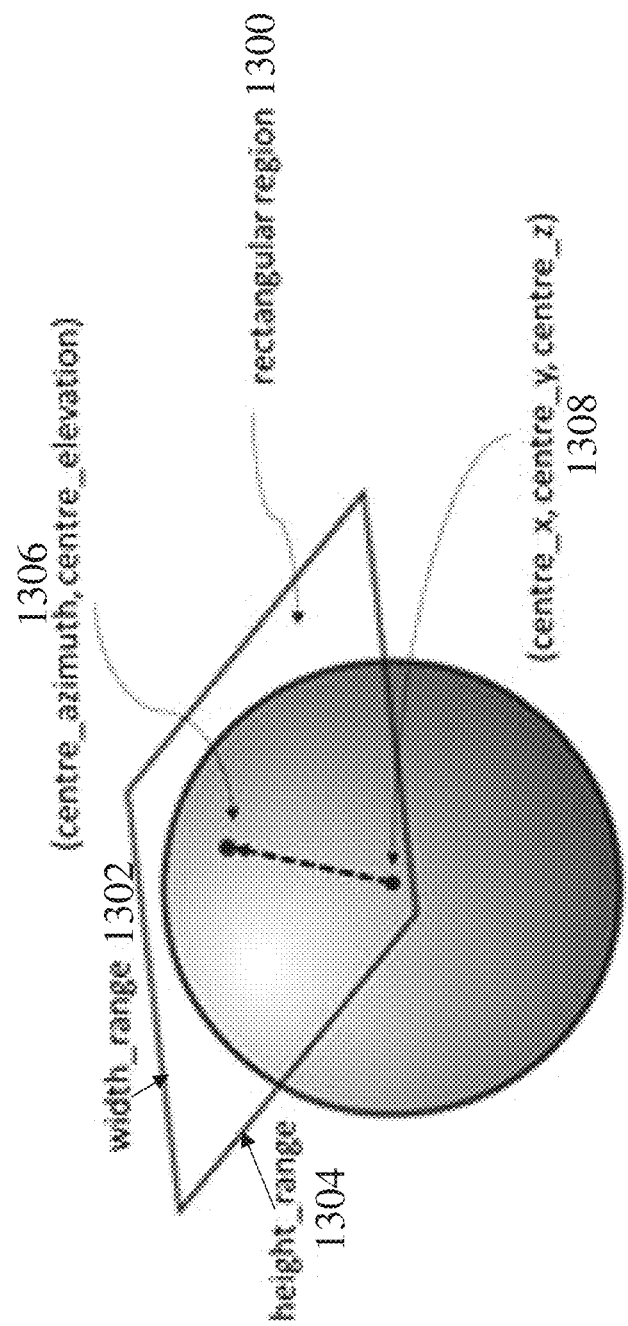
FIG. 13 shows an example of 3D Cartesian coordinates for a 2D rectangular region, according to some examples.

FIG. 13 shows an example of 3D Cartesian coordinates for a 2D rectangular region 1300, according to some examples. The rectangular region 1300 has a width shown by width_range 1302 and a height shown by height_range 1304. The rectangular region 1300 has a center 1306 located at the specified azimuth and elevation, indicated by center_azimuth and center_elevation, respectively.

FIG. 14 shows an exemplary syntax for a 3D Cartesian coordinates sample entry 1400, according to some embodiments. For illustrative purposes, an example can include the 3DCartesianCoordinatesSampleEntry '3dcc' which extends MetadataSampleEntry, which will be used to explain the concepts herein, although one of skill can appreciate that other nomenclatures, structures, and/or fields can be used without departing from the spirit of the invention. As explained further herein, in some embodiments the 3D Cartesian coordinates sample entry 1400 can provide spatial information of a rectangular region, such as by its weight and height, in relation to the referenced track (e.g., where the reference track is expressed in a 3D spherical coordinate system).

The 3D Cartesian coordinates sample entry 1400 can include fields that are similar to the fields discussed in conjunction with the 3D spherical coordinate sample entry 800 (e.g., dynamic_orientation_flag 804, dynamic_range_flag 806, the unit_sphere_flag 808, static_centre_azimuth 810, static_centre_elevation 812, static_centre_tilt 814, and sphere_radius 820). Referring to the 3D Cartesian coordinates sample entry 1400, the dynamic_orientation_flag 1402 can specify whether the orientation changes in the samples referring to this sample entry. The dynamic_range_flag 1404 can specify whether the range changes in the samples referring to this sample entry. The unit_sphere_flag 1406 can indicate whether the sphere is a unit sphere. The static_centre_azimuth 1408 and static_centre_elevation 1410 can specify the azimuth and elevation values, respectively, of the center of the rectangular region. The static_centre_tilt 1412 can specify the tilt angle of the rectangular region. The sphere_radius 1418 can specify the radius of the sphere.

The 3D spherical coordinate sample entry 800 can also include additional fields related to the dimensions of the region. In this example, the static_width_range 1414 and static_height_range 1416, when present, can specify the width and height ranges, respectively, of the rectangular region for each sample referring to this sample entry. The static_width_range 1414 and static_height_range 1416 can specify the ranges through the center point of the rectangular region, as shown in FIG. 13. When the static_width_range 1414 and static_height_range 1416 are not present (e.g., the dynamic_range_flag 1404==1), the width and height ranges of the rectangular region can assume the values of the width_range and height_range specified in the samples referring to this sample entry.

As shown in the 3D Cartesian coordinate sample entry 1400, the dynamic_orientation_flag 1402 and/or the dynamic_range_flag 1404 can control the size and number of fields of the 6D Cartesian coordinate sample entry 1400. If one or more of the dynamic_orientation_flag 1402 and/or the dynamic_range_flag 1404 is set to 0 in this example, then the associated fields are defined as part of the sample (otherwise, the fields are not defined). Advantageously, for static aspects, including orientation and/or range, the size of the sample entry can be controlled accordingly.

FIG. 15 shows an exemplary syntax for a 3D Cartesian coordinates sample 1500, according to some embodiments. For illustrative purposes, an example can include the 3DCartesianCoordinatesSample class, which will be used to explain the concepts herein, although one of skill can appreciate that other nomenclatures, structures, and/or fields can be used without departing from the spirit of the invention.

The 3D spherical coordinates sample 1500 can include fields that are similar to the fields discussed in conjunction with the 3D spherical coordinate sample 900 (e.g., centre_azimuth 902, centre_elevation 904, centre_tilt 906, and interpolate 912). The centre_azimuth 1502 and centre_elevation 1504 can specify the azimuth and elevation values, respectively, of the center of the rectangular region. The centre_tilt 1506 can specify the tilt angle of the rectangular region. The interpolate 1512 can indicate the continuity in time of the successive samples.

The 3D Cartesian coordinates sample 1500 can also include additional fields related to the size of the rectangular region. The width_range 1508 and height_range 1510, when present, can specify the width and height ranges, respectively, of the rectangular region. The width_range 1508 and height_range 1510 specify the ranges through the center point of the rectangular region, as shown in FIG. 13. When the width_range 1508 and height_range 1510 are not present (e.g., dynamic_range_flag==0), the width and height ranges of the rectangular region can assume the values of the static_width_range and static_height_range specified in the sample entry.

As shown in the exemplary 3D Cartesian coordinates sample 1500, the dynamic_orientation_flag and dynamic_size_flag specified using the 3D Cartesian coordinates sample entry can control the size and number of fields of the 3D Cartesian coordinates sample 1500. If either, or both, of the dynamic_orientation_flag and dynamic_size_flag is set to false, then the associated fields are not defined as part of the sample. Advantageously, for static aspects, including size and/or orientation, the size of the sample entry can be controlled accordingly.

6D Cartesian coordinates can be specified for content with 6DoF, but with the field of view a 2D rectangular region, rather than a 3D spherical region. Referring further to FIG. 13, the center of the sphere region 1308 can be specified (e.g., via centre_x, centre_y, and centre_z). FIG. 16 is an exemplary syntax for a 6D Cartesian coordinates sample entry 1600, according to some embodiments. For illustrative purposes, an example can include the 6DCartesianCoordinatesSampleEntry '6dcc' that extends MetadataSampleEntry, which will be used to explain the concepts herein, although one of skill can appreciate that other nomenclatures, structures, and/or fields can be used without departing from the spirit of the invention. The 6D Cartesian coordinates sample entry can provide spatial information of a rectangular region (e.g., including its weight and height), related to the referenced track expressed in a three-dimension spherical coordinate system. The 6D Cartesian coordinates sample entry can additionally include three-degrees of freedom in full translational movements along the X, Y and Z axes.

The 6D Cartesian coordinates sample entry 1600 can include fields that are similar to the fields discussed in conjunction with the 3D spherical coordinate sample entry 800 (e.g., shape_type 802, dynamic_orientation_flag 804, dynamic_range_flag 806, the unit_sphere_flag 808, static_centre_azimuth 810, static_centre_elevation 812, static_centre_tilt 814, and sphere_radius 820). The shape_type 1602 can be used to indicate how the sphere region is specified (e.g., four great circles, two azimuth circles and two elevation circles, and/or the like). The dynamic_orientation_flag 1606 can specify whether the orientation changes in the samples referring to this sample entry. The dynamic_range_flag 1608 can specify whether the range changes in the samples referring to this sample entry. The unit_sphere_flag 1610 can indicate whether the sphere is a unit sphere. The static_centre_azimuth 1618 and static_centre_elevation 1620 can specify the azimuth and elevation values, respectively, of the center of the rectangular region. The static_centre_tilt 1622 can specify the tilt angle of the rectangular region. The sphere_radius 1628 can specify the radius of the sphere.

The 6D Cartesian coordinates sample entry 1600 can also include fields that are similar to the fields discussed in conjunction with the 6D spherical coordinates sample entry 1100, which are related to the additional 3 DoF (e.g., dynamic_location_flag 1104, static_centre_x 1112, static_centre_y 1114, and static_centre_z 1116). The dynamic_location_flag 1604 can specify whether the center location of the sphere changes. The static_centre_x 1612, static_centre_y 1614, and static_centre_z 1616 can specify the x, y and z axis values, respectively, of the center of the sphere region, with respect to the origin of the underlying coordinate system.

The static_width_range 1624 and static_height_range 1626, when present, can specify the width and height ranges, respectively, of the rectangular region for each sample referring to this sample entry. The static_width_range 1624 and static_height_range 1626 can specify the ranges through the center point of the rectangular region, as illustrated in FIG. 13. When the static_width_range 1624 and static_height_range 1626 are not present (e.g., dynamic_range_flag==1), the width and height ranges of the rectangular region can assume the values of the width_range and height_range specified in the samples that refer to this sample entry.

As shown in the 6D Cartesian coordinate sample entry 1600, the dynamic_location_flag, dynamic_orientation_flag, and the dynamic_range_flag can control the size and number of fields of the 6D Cartesian coordinate sample entry 1600. If one or more of the dynamic_location- _flag, dynamic_orientation_flag, and the dynamic_range_flag is set to 0 in this example, then the associated fields are defined as part of the sample (otherwise, the fields are not defined). Advantageously, for static aspects, including location, orientation and/or range, the size of the sample entry can be controlled accordingly.

FIG. 17 shows an exemplary syntax for a 6D Cartesian coordinate sample 1700, according to some embodiments. For illustrative purposes, an example can include the 6DCartesianCoordinatesSample class, which will be used to explain the concepts herein, although one of skill can appreciate that other nomenclatures, structures, and/or fields can be used without departing from the spirit of the invention.

The 6D Cartesian coordinates sample 1700 can include fields that are similar to the fields discussed in conjunction with the 3D spherical coordinate sample 900 (e.g., centre_azimuth 902, centre_elevation 904, centre_tilt 906, and interpolate 912). The centre_azimuth 1710 and centre_elevation 1712 can specify the azimuth and elevation values, respectively, of the center of the sphere region. The centre_tilt 1714 can specify the tilt angle of the sphere region. The interpolate 1720 can indicate the continuity in time of the successive samples.

The 6D Cartesian coordinates sample 1700 can include additional fields related to the additional 3 DoF that are similar to those discussed in conjunction with the 6D spherical coordinates sample 1200 (e.g., centre_x 1202, centre_y 1204 and centre_z 1206). In particular, the centre_x 1702, centre_y 1704 and centre_z 1706 can specify the x, y and z axis values, respectively, of the center of the sphere region.

The width_range 1716 and height_range 1718, when present, can specify the width and height ranges, respectively, of the rectangular region. The width_range 1716 and height_range 1718 can specify the ranges through the center point of the rectangular region, as shown in FIG. 13. When width_range 1716 and height_range 1718 are not present (e.g., dynamic_range_flag=0), the width and height ranges of the rectangular region can assume the values of the static_width_range and static_height_range specified in the sample entry.

The 3D or 6D spherical coordinates (e.g., '3dsc' or '6dsc' discussed herein) and/or Cartesian coordinates (e.g., '3dcc' or '6dcc' discussed herein) can be restricted or provided within certain ranges. For example, the coordinates can be profiled into different sets of spherical and Cartesian coordinates. In some embodiments, the coordinates can be profiled by adding or restricting rotation and movement ranges along the x, y and z axes. The profiling can be used for different types of VR content, such as the 3DoF+, windowed 6DoF and omnidirectional 6DoF types of VR content, as examples.

In some embodiments, translational movements can be supported for the coordinates. For example, 3DoF+VR content can include 3DoF content enhanced with additional limited translational movements (e.g., head movements) along the X, Y and/or Z axes. The 3DoF+VR content can allow a user to move head, and not just rotate their head, but also to move it left, right, forward, backward, etc. within specified range(s). Referring to FIG. 10, the X axis 1002 (pitch) can include limited movements between limit 1002A and limit 1002B, the Y axis 1004 (yaw) can include limited movements between limit 1004A and limit 1004B, the Z axis 1006 (roll) can include limited movements between limit 1006A and limit 1006B. Attributes for such ranges of translational movements along the X, Y and Z axes can be added to the spherical and/or Cartesian coordinates. For example, attributes can be added to the '3dsc' example discussed herein to support 3DoF+ content. In some embodiments, the attributes can be maximum and/or minimum limits in one or more directions. In some embodiments, the attributes can define a spherical (e.g., instead of cubic) viewing space. The spherical viewing space can be specified using maximum and/or minimum limits in one or more directions.

As another example, omnidirectional 6DoF VR content can include content with 6DoF such that translational movements along the X, Y and/or Z axes (e.g., a couple of steps walking distance) are constrained to certain ranges. In some embodiments, attributes for ranges of translational movements along X, Y and/or Z axes can be added to '6dsc' to support omnidirectional 6DoF content.

Figure 18:
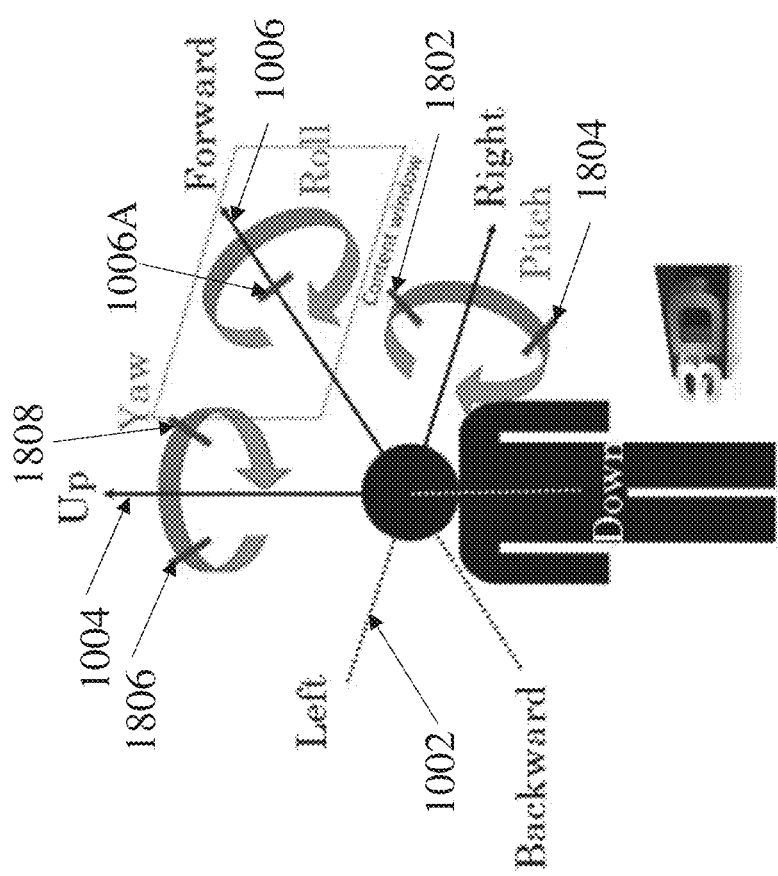
FIG. 18 shows the same three axes shown in FIG. 10 with rotational ranges around the axes, according to some examples.

In some embodiments, both rotational and translational movements can be supported for the coordinates. For example, windowed 6DoF VR content can include content with 6DoF whose rotational movements around X and Y axes (respectively pitch and yaw) and translational movements along Z axis are constrained to certain ranges, as shown in FIG. 18. FIG. 18 shows the same three axes shown in FIG. 10: the X axis 1002 (pitch), the Y axis 1004 (yaw), and the Z axis 1006 (roll), and the limit 1006A on the Z axis 1006. FIG. 18 also includes the limits 1802 and 1804 for rotational movements around the X axis 1002, and limits 1806 and 1808 for rotational movements about the Y axis 1004. Attributes such as those shown in FIG. 18, including support for constraining the rotational and/or translational movements to certain ranges, can be added to the coordinates (e.g., by adding the attributes to '6dsc' to support windowed 6DoF content). As described herein, in some embodiments, for example, the attributes can be maximum and/or minimum limits in one or more directions, can define a viewing space, and/or the like.

The techniques discussed herein can be used when encoding multimedia content, and can be processed when decoding multimedia content. When encoding multimedia content, an encoding device can use the techniques described herein to provide one or more global (e.g., static) aspects of a region. When decoding multimedia content, a decoding device can decode the multimedia content by determining the one or more global aspects of the region, and using the determined aspect(s) for the samples associated with the region.

Figure 19:
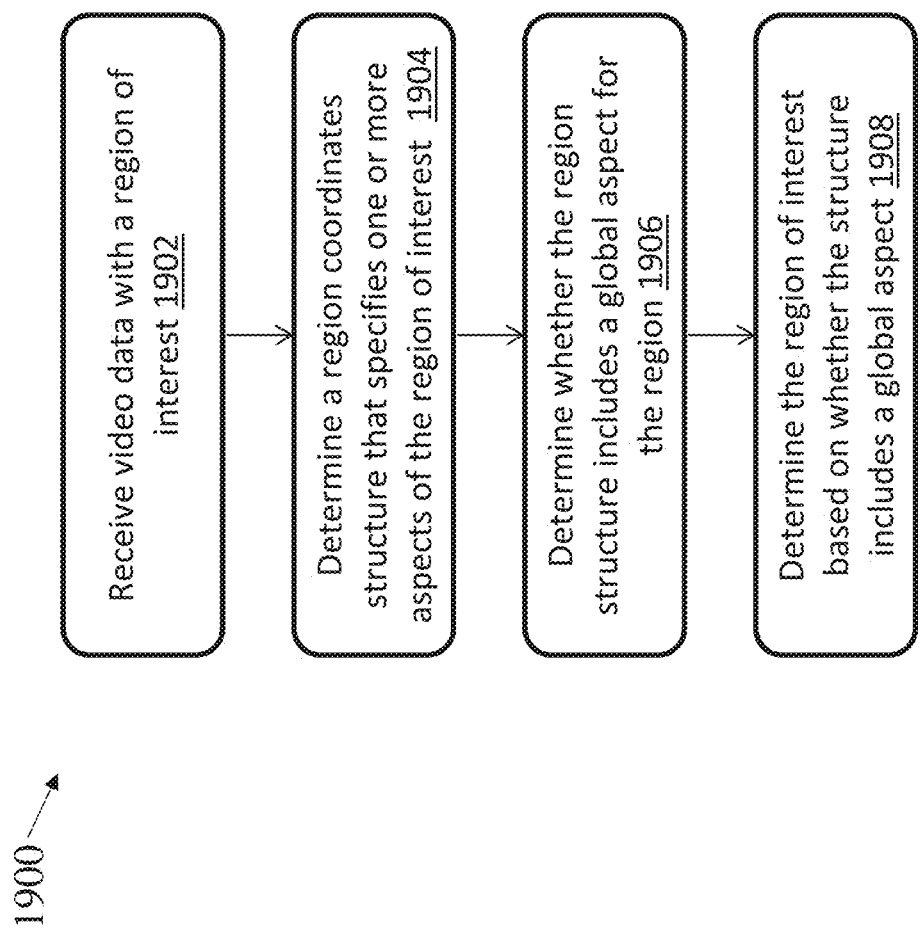
FIG. 19 shows an exemplary method of decoding video data with a region of interest, according to some embodiments.

FIG. 19 shows an exemplary method 1900 of decoding video data with a region of interest, according to some embodiments. At step 1902, the decoding device receives video data comprising a region of interest. At step 1904, the decoding device determines a region coordinates structure associated with the video data that specifies one or more aspects of the region of interest based on a sphere. At step 1906, the decoding device determines whether the region structure includes a global aspect for the region of interest. At step 1908, the decoding device determines the region of interest in the video data based on whether the region structure comprises data indicative of the one or more global aspects of the region of interest.

Referring to step 1902, the region coordinates structure can include, for example, a 2D Cartesian coordinates sample entry, a 3D Spherical coordinates sample entry, a 6D Spherical coordinates sample entry, a 3D Cartesian coordinates sample entry, a 6D Cartesian coordinate sample entry, a profiled coordinates sample entry with range information, and/or the like. The region of interest can be a spherical region, a rectangular region, and/or the like.

Referring to step 1904, the region structure can specify one or more aspects of the region of interest. For example, the aspects can include an orientation, location, range, size, and/or other aspects of the region of interest. The region structure can include, for example, one or more flags indicative of whether the region structure includes global (e.g., static) information that applies to samples associated with the region structure. The flags can include, for example, a dynamic orientation flag, a dynamic_location_flag, a dynamic_range_flag, a dynamic_size_flag, and/or other flags indicative of whether the region structure specifies information that applies to the samples associated with the region of interest.

Referring to step 1906, the decoding device determines whether the region structure includes a global (e.g., static) coordinate aspect (e.g., location, orientation, range, size, etc.) for the region of interest. In some embodiments, the decoding device may determine that the region structure includes one or more global aspects. In some embodiments, the decoding device may determine that the region structure includes one or more global aspects, but does not include one or more other aspects. For example, the region structure may specify a global aspect (e.g., location, orientation or range), while the region structure may not specify other possible aspects (e.g., such that the non-specified location, orientation, range, etc. are specified for each sample that is associated with the region of interest).

Referring to step 1908, the decoding device determines the region of interest in the video data based on whether the region structure comprises data indicative of the one or more global aspects of the region of interest. The decoding device determines which aspects are specified by the region structure (e.g., which apply to the samples referencing the region structure), as well as the other aspects specified on a per-sample basis. For an illustrative example for 3D spherical coordinates, the decoding device may determine that the '3dsc' region structure specifies both a static orientation (e.g., static center_azimuth, elevation and tilt) and range (e.g., static azimuth and elevation_range), and therefore the 3D spherical coordinate sample for each sample does not specify either the orientation or range. As another example, the decoding device may determine that the '3dsc' region structure specifies only a static orientation, and therefore the 3D spherical coordinate sample for each sample specifies the (e.g., non-static) range.

In some embodiments, as discussed herein, 3D spherical or rectangular coordinates can include a global orientation or range. The orientation can be, for example, a center_azimuth, elevation and tilt. The range can be, for example, an azimuth and elevation_range for 3D spherical coordinates, or a width or height_range for 3D rectangular coordinates. In some embodiments, the 6D spherical or rectangular coordinates can further include a dynamic location. The dynamic location can be, for example, a center point specified as (x, y, z).

In some embodiments, as discussed herein, 2D Cartesian coordinates can include a global location or size. The location can specify, for example, an (x, y) position of the top-left corner of a rectangular region. The size can specify, for example, the width and height of the rectangular region.

As discussed herein, the techniques can be similarly used to encode video content. An encoding device can encoding video data with a region of interest by encoding a region structure associated with the video data that specifies one or more aspects of the region of interest based on a sphere. The region structure can include data indicative of whether the region structure comprises data indicative of one or more global aspects of the region of interest that applies to each of a set of samples associated with the region structure.

The encoding device can encode various data. For example, the encoding device can encode data indicative of the region structure not specifying a first global coordinate aspect of the region of interest, and can encode, for each sample associated with the region structure, a first coordinate aspect for the sample for the region of interest. As another example, the encoding device can encode data indicative of an orientation of the region of interest and a range of the region of interest, wherein the orientation and range applies to each sample associated with the region structure. The data indicative of a range of the region of interest can include an azimuth and elevation of the region of interest. The data indicative of a range of the region of interest can include a width and a height of the region of interest. The encoding device can encode, in the region structure, data indicative of a location of the region of interest, wherein the location applies to each sample associated with the region structure. The location can include a center location of the region of interest. The encoding device can encode data indicative of a location of the region of interest and a size of the region of interest, wherein the location and size applies to each sample associated with the region structure.

Various exemplary syntaxes and use cases are described herein, which are intended for illustrative purposes and not intended to be limiting. It should be appreciated that only a subset of these exemplary fields may be used for a particular region and/or other fields may be used, and the fields need not include the field names used for purposes of description herein. For example, the syntax may omit some fields and/or may not populate some fields (e.g., or populate such fields with a null value) depending on the type of ROI or viewport. As another example, other syntaxes and/or classes can be used without departing from the spirit of the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code.

Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
receiving video data comprising a region of interest;
determining a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising:
data indicative of whether each of the one or more aspects of the region structure comprises data indicative of a global aspect of the region of interest that applies to each of a set of samples that provide one or more non-global aspects for at least one portion of the region of interest; and
for each global aspect of the one or more aspects, data in the region structure that associates the global aspect with the set of samples; and
determining the region of interest in the video data based on the data indicative of whether the region structure comprises data indicative of the one or more aspects of the region of interest comprising:
for each global aspect, determining the data in the region structure for the set of samples, such that each sample in the set of samples specifies any non-global aspects for the sample and inherits the global aspect for the at least one portion of the region of interest.

2. The method of claim 1, wherein determining the region of interest in the video data based on the data indicative of whether the region structure comprises data indicative of one or more aspects of the region of interest comprises:
determining the region structure does not specify a first global coordinate aspect of the region of interest; and
determining, for each sample associated with the region structure, a first coordinate aspect for the sample for the region of interest.

3. The method of claim 1, wherein determining the region of interest in the video data based on the data indicative of whether the region structure comprises data indicative of one or more aspects of the region of interest comprises:
determining the region structure comprises data indicative of an orientation of the region of interest and a range of the region of interest; and
determining the orientation and range of the region of interest, wherein the orientation and range applies to each sample associated with the region structure.

4. The method of claim 3, wherein determining the region structure comprises data indicative of the range of the region of interest comprises determining an azimuth and elevation of the region of interest.

5. The method of claim 3, wherein determining the region structure comprises data indicative of the range of the region of interest comprises determining a width and a height of the region of interest.

6. The method of claim 3, further comprising:
determining the region structure comprises data indicative of a location of the region of interest; and
determining the location of the region of interest, wherein the location applies to each sample associated with the region structure.

7. The method of claim 6, wherein determining the location comprises determining a center location of the region of interest.

8. The method of claim 1, wherein determining the region of interest in the video data based on the data indicative of whether the region structure comprises data indicative of one or more aspects of the region of interest comprises:
determining the region structure comprises data indicative of a location of the region of interest and a size of the region of interest; and determining the location and size of the region of interest, wherein the location and size applies to each sample associated with the region structure.

9. A method for encoding video data, the method comprising:
encoding video data comprising a region of interest, comprising:
encoding a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising:
data indicative of whether each of the region structure comprises data indicative of a global aspect of the region of interest that applies to each of a set of samples that provide one or more non-global aspects for at least one portion of the region of interest; and
for each global aspect of the one or more aspects, data in the region structure that associates the global aspect with the set of samples.

10. The method of claim 9, wherein encoding the region of interest in the video data comprises:
encoding data indicative of the region structure not specifying a first global coordinate aspect of the region of interest; and
encoding, for each sample associated with the region structure, a first coordinate aspect for the sample for the region of interest.

11. The method of claim 9, wherein encoding the region of interest comprises:
encoding data indicative of an orientation of the region of interest and a range of the region of interest, wherein the orientation and range applies to each sample associated with the region structure.

12. The method of claim 11, wherein encoding data indicative of a range of the region of interest comprises encoding an azimuth and elevation of the region of interest.

13. The method of claim 11, wherein encoding data indicative of a range of the region of interest comprises encoding a width and a height of the region of interest.

14. The method of claim 11, further comprising:
encoding, in the region structure, data indicative of a location of the region of interest, wherein the location applies to each sample associated with the region structure.

15. The method of claim 14, wherein encoding the location comprises encoding a center location of the region of interest.

16. The method of claim 9, wherein encoding the region structure comprises:
encoding data indicative of a location of the region of interest and a size of the region of interest, wherein the location and size applies to each sample associated with the region structure.

17. An apparatus configured to decode video data, the apparatus comprising a processor in communication with memory, the processor being configured to execute instructions stored in the memory that cause the processor to:
receive video data comprising a region of interest;
determine a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising:
data indicative of whether the region structure comprises data indicative of a global aspect of the region of interest that applies to each of a set of samples that provide one or more non-global aspects for at least one portion of the region of interest; and
for each global aspect of the one or more aspects, data in the region structure that associates the global aspect with the set of samples; and
determine the region of interest in the video data based on the data indicative of whether the region structure comprises data indicative of the one or more aspects of the region of interest comprising:
for each global aspect, determining the data in the region structure for the set of samples, such that each sample in the set of samples specifies any non-global aspects for the sample and inherits the global aspect for the at least one portion of the region of interest.

18. An apparatus for encoding video data, the apparatus comprising a processor in communication with memory, the processor being configured to execute instructions stored in the memory that cause the processor to:
encode video data comprising a region of interest, comprising:
encoding a region structure associated with the video data that specifies one or more aspects of the region of interest based on a sphere, wherein the one or more aspects comprise a coordinate aspect of the region of interest, a size aspect of the region of interest, a range aspect of the region of interest, or some combination thereof, the region structure comprising:
data indicative of whether the region structure comprises data indicative of a global aspect of the region of interest that applies to each of a set of samples that provide one or more non-global aspects for at least one portion of the region of interest; and
for each global aspect of the one or more aspects, data in the region structure that associates the global aspect with the set of samples.

* * * * *